US008401245B2

(12) United States Patent
Hashimoto

(10) Patent No.: US 8,401,245 B2
(45) Date of Patent: Mar. 19, 2013

(54) BIOMETRIC AUTHENTICATION USING VARIABLE THRESHOLD BASED ON NORMAL ENTRY/EXIT TIMES

(75) Inventor: Yasunari Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1226 days.

(21) Appl. No.: 12/141,049

(22) Filed: Jun. 17, 2008

(65) Prior Publication Data

US 2008/0317294 A1 Dec. 25, 2008

(30) Foreign Application Priority Data

Jun. 21, 2007 (JP) ................................ P2007-163236

(51) Int. Cl.
*G06K 9/00* (2006.01)

(52) U.S. Cl. ........................ 382/115; 340/5.52; 340/5.82

(58) Field of Classification Search ........................ None
See application file for complete search history.

(56) References Cited

U.S. PATENT DOCUMENTS

| | | | | |
|---|---|---|---|---|
| 6,608,914 | B1 * | 8/2003 | Yamaguchi et al. | 382/118 |
| 6,850,147 | B2 * | 2/2005 | Prokoski et al. | 340/5.53 |
| 2003/0039380 | A1 * | 2/2003 | Sukegawa et al. | 382/118 |
| 2004/0036574 | A1 * | 2/2004 | Bostrom | 340/5.82 |
| 2004/0164848 | A1 * | 8/2004 | Hwang et al. | 340/5.82 |
| 2007/0237367 | A1 * | 10/2007 | Yamato et al. | 382/118 |
| 2009/0320538 | A1 * | 12/2009 | Pellaton | 70/278.1 |
| 2010/0225443 | A1 * | 9/2010 | Bayram et al. | 340/5.83 |

FOREIGN PATENT DOCUMENTS

| | | |
|---|---|---|
| JP | 05-266291 | 10/1993 |
| JP | 2000-215308 | 8/2000 |
| JP | 2007-26205 | 1/2007 |

OTHER PUBLICATIONS

Mitra, S. (2006) "Towards statistically rigorous biometric authentication using facial images." In Statistical Methods in Counterterrorism: Game Theory, Modeling, Syndromic Surveillance, and Biometric Authentication. Olwell, D.H., Ed., pp. 47-79.*

Rukhin et al. (2006) "Recognition problem of biometrics: nonparametric dependence measures and aggregated algorithms." In Statistical Methods in Counterterrorism: Game Theory, Modeling, Syndromic Surveillance, and Biometric Authentication. Olwell, D.H., Ed., pp. 81-97.*

Banks et al. (2006) "Biometric authentication." In Statistical Methods in Counterterrorism: Game Theory, Modeling, Syndromic Surveillance, and Biometric Authentication. Olwell, D.H., Ed., pp. 41-45.*

* cited by examiner

*Primary Examiner* — Barry Drennan

(74) *Attorney, Agent, or Firm* — Finnegan, Henderson, Farabow, Garrett & Dunner LLP

(57) ABSTRACT

An authentication apparatus includes a time-information storage unit configured to store a reference time used for authentication; a biometric-information storage unit configured to store biometric information used for authentication; a biometric-information obtaining unit configured to obtain biometric information of a person; a matching-score calculating unit configured to calculate a matching score representing a degree of similarity between the biometric information stored in the biometric-information storage unit and the obtained biometric information; a current-time obtaining unit configured to obtain a current time; a threshold setting unit configured to set a threshold used for authentication, on the basis of the obtained current time and the reference time stored in the time-information storage unit; and an authentication-result determining unit configured to determine success or failure of authentication regarding the obtained biometric information, on the basis of the calculated matching score and the set threshold.

19 Claims, 17 Drawing Sheets

FIG. 6A

401

| USER ID | 001 | | | 002 | 003 | ...... |
|---|---|---|---|---|---|---|
| DATE | COMING HOME 1 | COMING HOME 2 | ...... | ...... | ...... | ...... |
| 2007/1/14 | 11:20 | 19:00 | ...... | ...... | ...... | ...... |
| 2007/1/15 | 19:16 | | ...... | ...... | ...... | ...... |
| 2007/1/16 | 20:12 | | ...... | ...... | ...... | ...... |
| 2007/1/17 | 07:15 | 20:02 | ...... | ...... | ...... | ...... |
| 2007/1/18 | 19:56 | | ...... | ...... | ...... | ...... |
| 2007/1/19 | 20:34 | | ...... | ...... | ...... | ...... |
| 2007/1/20 | | | ...... | ...... | ...... | ...... |
| 2007/1/21 | 2:00 | 20:55 | ...... | ...... | ...... | ...... |
| 2007/1/22 | 19:45 | | ...... | ...... | ...... | ...... |
| 2007/1/23 | 07:05 | 20:32 | ...... | ...... | ...... | ...... |
| 2007/1/24 | 19:25 | | ...... | ...... | ...... | ...... |
| 2007/1/25 | 20:42 | | ...... | ...... | ...... | ...... |
| ...... | ...... | ...... | ...... | ...... | ...... | ...... |

FIG. 6B

402

| USER ID | 001 | | | | | 002 | 003 | ...... |
|---|---|---|---|---|---|---|---|---|
| DAY OF WEEK | MON. | TUE. | WED. | THU. | FRI. | ...... | ...... | ...... |
| AVERAGE TIME OF COMING HOME | 20:12 | 20:03 | 20:05 | 19:56 | 20:32 | ...... | ...... | ...... |

411

| USER ID | 001 | | | 002 | 003 | ······ |
|---|---|---|---|---|---|---|
| DATE | COMING HOME | COMING HOME | ······ | ······ | ······ | ······ |
| 2007/5/26 | 11:30 | 21:00 | ······ | ······ | ······ | ······ |
| 2007/5/27 | 19:00 | | ······ | ······ | ······ | ······ |
| 2007/6/02 | 18:00 | | ······ | ······ | ······ | ······ |
| 2007/6/03 | 20:00 | | ······ | ······ | ······ | ······ |
| ······ | ······ | ······ | ······ | ······ | ······ | ······ |

FIG. 11A

420

| USER ID | 001 | | | | | 002 | 003 | ...... |
|---|---|---|---|---|---|---|---|---|
| DATE | LEAVING HOME 1 | COMING HOME 1 | LEAVING HOME 2 | COMING HOME 2 | ...... | ...... | ...... | ...... |
| 2007/1/14 | 07:02 | 11:20 | 13:00 | 19:00 | ...... | ...... | ...... | ...... |
| 2007/1/15 | 07:03 | 19:16 | | | ...... | ...... | ...... | ...... |
| 2007/1/16 | 06:58 | 20:12 | | | ...... | ...... | ...... | ...... |
| 2007/1/17 | 07:13 | 07:15 (421) | 07:16 | 20:02 | ...... | ...... | ...... | ...... |
| 2007/1/18 | 07:20 | 19:56 | | | ...... | ...... | ...... | ...... |
| 2007/1/19 | 06:58 | 20:34 | | | ...... | ...... | ...... | ...... |
| 2007/1/20 | 07:00 | N (422) | | | ...... | ...... | ...... | ...... |
| 2007/1/21 | N (423) | 2:00 | 07:14 | 20:55 | ...... | ...... | ...... | ...... |
| 2007/1/22 | 06:46 | 19:45 | | | ...... | ...... | ...... | ...... |
| 2007/1/23 | 06:58 | 07:05 | N (424) | 20:32 (425) | ...... | ...... | ...... | ...... |
| 2007/1/24 | 07:03 | 19:25 | | | ...... | ...... | ...... | ...... |
| 2007/1/25 | 06:58 | 20:42 | | | ...... | ...... | ...... | ...... |
| ...... | ...... | ...... | ...... | ...... | ...... | ...... | ...... | ...... |

FIG. 11B

430

| USER ID | 001 | | | | | 002 | 003 | ...... |
|---|---|---|---|---|---|---|---|---|
| DAY OF WEEK | MON. | TUE. | WED. | THU. | FRI. | ...... | ...... | ...... |
| AVERAGE TIME OF LEAVING HOME | 07:10 | 07:02 | 07:04 | 07:07 | 07:10 | ...... | ...... | ...... |
| AVERAGE TIME OF COMING HOME | 20:12 | 20:03 | 20:05 | 19:56 | 20:32 | ...... | ...... | ...... |

| DISTANCE | THRESHOLD | ARRIVAL TIME |
|---|---|---|
| -1km | 80% | 10:00 |
| 1-3km | 90% | 15:00 |
| 3-5km | 95% | 20:00 |

BIOMETRIC AUTHENTICATION USING VARIABLE THRESHOLD BASED ON NORMAL ENTRY/EXIT TIMES

CROSS REFERENCES TO RELATED APPLICATIONS

The present invention contains subject matter related to Japanese Patent Application JP 2007-163236 filed in the Japanese Patent Office on Jun. 21, 2007, the entire contents of which are incorporated herein by reference.

BACKGROUND OF THE INVENTION

1. Field of the Invention

The present invention relates to authentication apparatuses. More specifically, the present invention relates to an authentication apparatus, an entry management apparatus, an entry and exit management apparatus, an entry management system, and an entry and exit management system in which authentication is executed on the basis of biometric information. The present invention also relates to processing methods for these apparatuses and systems, and to programs for causing computers to execute the processing methods.

2. Description of the Related Art

In order to maintain security in buildings or sites, personal authentication is often executed at entrances of the buildings or sites. A large number of apparatuses for executing such personal authentication have been developed. For example, in a type of entry management apparatus, an authentication apparatus is provided at an entrance of a building, the authentication apparatus identifies a person trying to enter the building, and a door at the entrance automatically opens only when authentication of the identified person ends successfully, whereby the person is allowed to enter the building. There exist some authentication apparatuses that execute personal authentication using, for example, a personal identification number or password for identifying an individual user. There also exist some authentication apparatuses that execute personal authentication using biometric information, such as faces or fingerprints of persons.

For example, in an entry/exit management apparatus shown in FIG. 1 of Japanese Unexamined Patent Application Publication No. 2007-26205, an iris-information obtaining apparatus and a passage controlling apparatus are provided in the proximity of an entrance of a room, and the passage controlling apparatus compares iris information of a person obtained by the iris-information obtaining apparatus with iris information stored in a storage unit. If the comparison results in matching, an electronic lock of a door at the entrance of the room is unlocked so that the person can enter the room.

SUMMARY OF THE INVENTION

According to the related art described above, since personal authentication is executed using biometric information relating to a part of the body of an individual user, in contrast to personal authentication based on a personal identification number or a password, the user need not remember information used for authentication. Furthermore, since leakage, stealing, forgery, or the like of information used for authentication is prevented, security is improved.

In personal authentication based on biometric information, the false acceptance rate and the false rejection rate have a trade-off relationship. That is, there is a trade-off relationship between two types of errors, namely, the false acceptance rate (FAR) representing the rate of incorrectly accepting another person to be rejected as a registrant and the false rejection rate (FRR) representing the rate of incorrectly rejecting an authentic registrant.

For example, if setting is made to reduce the probability of accepting another person as a registrant in an authentication apparatus provided at an entrance of the home of the registrant, the probability of rejecting the authentic registrant increases. In this case, for example, if the image of a portion of the body picked up for authentication is poor or if the registrant is not in good health, it could occur that the authentic registrant is not allowed to enter the home.

Conversely, if setting is made to reduce the probability of rejecting the authentic registrant, the probability of accepting another person as the registrant increases. In this case, for example, it becomes important to ensure security of the home. As described above, in personal authentication based on biometric information, it is important to improve convenience while maintaining security.

In this respect, it is desired to improve convenience while maintaining security.

According to a first embodiment of the present invention, there is provided an authentication apparatus (e.g., an authentication apparatus 200). The authentication apparatus includes time-information storage means (e.g., an entry/exit time database 292 or a user scheduler 293) for storing a reference time used for authentication; biometric-information storage means (e.g., an authentication dictionary 291) for storing biometric information used for authentication; biometric-information obtaining means (e.g., a camera controller 240) for obtaining biometric information of a person; matching-score calculating means (e.g., a comparing unit 213) for calculating a matching score representing a degree of similarity between the biometric information stored in the biometric-information storage means and the obtained biometric information; current-time obtaining means (e.g., a current-time obtaining unit 214) for obtaining a current time; threshold setting means (e.g., a threshold setting unit 215) for setting a threshold used for authentication, on the basis of the obtained current time and the reference time stored in the time-information storage means; and authentication-result determining means (e.g., an authentication-result determining unit 216) for determining success or failure of authentication regarding the obtained biometric information, on the basis of the calculated matching score and the set threshold. According to the first embodiment, there is also provided an authentication processing method or a computer program for causing a computer to execute the authentication processing method. The authentication processing method includes the steps of obtaining biometric information of a person (e.g., step S911); obtaining a current time (e.g., step S921); calculating a matching score representing a degree of similarity between the biometric information stored in the biometric-information storage means and the obtained biometric information (e.g., step S924); setting a threshold used for authentication, on the basis of the obtained current time and the reference time stored in the time-information storage means (e.g., steps S927, S929, S947, and S948); and determining success or failure of authentication regarding the obtained biometric information, on the basis of the calculated matching score and the set threshold (e.g., step S930). Accordingly, a matching score representing a similarity between the biometric information stored in the biometric-information storage means and the obtained biometric information is calculated, a threshold used for authentication is set on the basis of the current time and the reference time, and success or failure of authentication regarding the obtained biometric information is determined on the basis of the calculated matching score and the set threshold.

In the authentication apparatus according to the first embodiment, for example, the reference time stored in the time-information storage means includes at least one of a preset scheduled entry time and a statistical entry time calculated on the basis of past statistical data, and if the scheduled entry time and the statistical entry time are both stored in the time-information storage means, the threshold setting means sets the threshold using the scheduled entry time. Accordingly, if the scheduled entry time and the statistical entry time are both stored in the time-information storage means, the threshold is set using the scheduled entry time.

The authentication apparatus according to the first embodiment may further include receiving means (e.g., a network controller 280) for receiving time information or position information for calculating the reference time from an external apparatus. In this case, the reference time stored in the time-information storage means is a time calculated on the basis of the time information or position information received from the external apparatus. Accordingly, a threshold used for authentication is set using the reference time calculated on the basis of the time information or position information received from the external apparatus.

The authentication apparatus according to the first embodiment may further include feature extracting means (e.g., a feature extracting unit 212) for extracting a feature relating to the obtained biometric information. In this case, the biometric-information storage means stores a feature relating to the biometric information together with the biometric information, and the matching-score calculating means calculates the matching score on the basis of the feature relating to the biometric information stored in the biometric-information storage means and the extracted feature relating to the obtained biometric information. Accordingly, a feature relating to the obtained biometric information is extracted, and a matching score is calculated on the basis of the extracted feature relating to the obtained biometric information and the biometric information stored in the biometric-information storage means.

In the authentication apparatus according to the first embodiment, for example, the time-information storage means stores a plurality of reference times for a plurality of persons in such a manner that the plurality of reference times are associated individually with the plurality of persons, the biometric-information storage means stores a plurality of pieces of biometric information for the plurality of persons in such a manner that the plurality of pieces of biometric information are associated individually with the plurality of persons, the matching-score calculating means selects a piece of biometric information having a highest degree of similarity with the obtained biometric information among the plurality of pieces of biometric information stored in the biometric-information storage means on the basis of features relating to the plurality of pieces of biometric information and the extracted feature relating to the obtained biometric information, and calculates the matching score on the basis of the feature relating to the selected piece of biometric information and the extracted feature relating to the obtained biometric information, and the threshold setting means sets the threshold on the basis of the obtained current time and on the basis of a reference time associated with a person relevant to the selected piece of biometric information among the plurality of reference times stored in the time-information storage means. Accordingly, a piece of biometric information having a highest degree of similarity with the obtained biometric information among the plurality of pieces of biometric information stored in the biometric-information storage means is selected, a matching score is calculated on the basis of the feature relating to the selected piece of biometric information and the extracted feature relating to the obtained biometric information, and a threshold is set on the basis of the obtained current time and on the basis of a reference time associated with a person relevant to the selected piece of biometric information.

In the authentication apparatus according to the first embodiment, for example, the biometric-information obtaining means includes first biometric-information obtaining means for obtaining biometric information of the person at a time of entry of the person and second biometric-information obtaining means for obtaining biometric information of the person at a time of exit of the person, the time-information storage means stores an entry time representing the time when the first biometric-information obtaining means obtained the biometric information and an exit time representing the time when the second biometric-information obtaining means obtained the biometric information, in such a manner that the entry time and the exit time are associated with the person relevant to the biometric information, the matching score calculating means calculates a matching score representing a degree of similarity between the biometric information stored in the biometric-information storage means and the biometric information obtained by the first biometric-information obtaining means, and the threshold setting means sets the threshold on the basis of the obtained current time and on the basis of consistency between the entry time and the exit time stored in the time-information storage means in association with the person relevant to the biometric information obtained by the first biometric-information obtaining means.

Accordingly, a matching score representing a degree of similarity between the biometric information stored in the biometric-information storage means and the biometric information obtained by the first biometric-information obtaining means is calculated, and a threshold is set on the basis of the obtained current time and on the basis of consistency between the entry time and the exit time associated with the person relevant to the biometric information obtained by the first biometric-information obtaining means.

In the authentication apparatus according to the first embodiment, for example, the biometric-information obtaining means includes first biometric-information obtaining means for obtaining biometric information of the person at a time of entry of the person and second biometric-information obtaining means for obtaining biometric information of the person at a time of exit of the person, the time-information storage means stores an entry time representing the time when the first biometric-information obtaining means obtained the biometric information and an exit time representing the time when the second biometric-information obtaining means obtained the biometric information, in such a manner that the entry time and the exit time are associated with the person relevant to the biometric information, the matching score calculating means calculates a matching score representing a degree of similarity between the biometric information stored in the biometric-information storage means and the biometric information obtained by the first biometric-information obtaining means, and the threshold setting means sets the threshold on the basis of the obtained current time and on the basis of the exit time stored in the time-information storage means in association with the person relevant to the biometric information obtained by the first biometric-information obtaining means. Accordingly, a matching score representing a degree of similarity between the biometric information stored in the biometric-information storage means and the biometric information obtained by the first biometric-information obtaining means is calculated, and a threshold is set on the basis of the obtained current time and on the basis of the exit time associated with the person relevant to the biometric information obtained by the first biometric-information obtaining means.

In the authentication apparatus according to the first embodiment, for example, the biometric-information storage means stores a plurality of types of biometric information used for authentication, the biometric-information obtaining means obtains a plurality of types of biometric information corresponding to the plurality of types of biometric information stored in the biometric-information storage means, and if it is determined that authentication regarding one type of biometric information among the plurality of types of obtained biometric information has failed, the authentication-result determining means determines success or failure of authentication regarding another type of biometric information among the plurality of types of obtained biometric information, the another type being different from the one type used for the failed authentication, on the basis of the calculated matching score and the set threshold. Accordingly, if it is determined that authentication regarding one type of biometric information among the plurality of types of obtained biometric information has failed, success or failure of authentication regarding another type of biometric information different from the one type used for the failed authentication is determined.

The authentication apparatus according to the first embodiment may further include person-estimation-information obtaining means (e.g., the network controller 280) for obtaining person-estimation information from a person estimating apparatus that estimates identity of a person. In this case, when the person-estimation-information obtaining means has obtained the person-estimation information from the person estimating apparatus, the threshold setting means sets the threshold to be a relatively low value for the person corresponding to the person-estimation information. Accordingly, the threshold to be a relatively low value for the person corresponding to the person-estimation information obtained from the person estimating apparatus.

According to a second embodiment of the present invention, there is provided an entry management apparatus (e.g., the authentication apparatus 200). The entry management apparatus includes time-information storage means (e.g., the entry/exit time database 292 or the user scheduler 293) for storing a reference time used for authentication; biometric-information storage means (e.g., the authentication dictionary 291) for storing biometric information used for authentication; biometric-information obtaining means (e.g., the camera controller 240) for obtaining biometric information of a person; matching-score calculating means (e.g., the comparing unit 213) for calculating a matching score representing a degree of similarity between the biometric information stored in the biometric-information storage means and the obtained biometric information; current-time obtaining means (e.g., the current-time obtaining unit 214) for obtaining a current time; threshold setting means (e.g., the threshold setting unit 215) for setting a threshold used for authentication, on the basis of the obtained current time and the reference time stored in the time-information storage means; authentication-result determining means (e.g., the authentication-result determining unit 216)) for determining success or failure of authentication regarding the obtained biometric information, on the basis of the calculated matching score and the set threshold; and entry permitting means (e.g., a system controller 220) for permitting entry of the person relevant to the obtained biometric information if the authentication regarding the obtained biometric information is determined as successful. According to the second embodiment, there is also provided a processing method for the entry management apparatus and a program for causing a computer to execute the processing method. Accordingly, a matching score representing a similarity between the biometric information stored in the biometric-information storage means and the obtained biometric information is calculated, a threshold used for authentication is set on the basis of the current time and the reference time, success or failure of authentication regarding the obtained biometric information is determined on the basis of the calculated matching score and the set threshold, and entry of the person relevant to the obtained biometric information is permitted if the authentication is determined as successful.

According to a third embodiment of the present invention, there is provided an entry-and-exit management apparatus (e.g., the authentication apparatus 200). The entry-and-exit management apparatus includes first biometric-information obtaining means (e.g., the camera controller 240) for obtaining biometric information of a person at a time of entry of the person; second biometric-information obtaining means (e.g., the camera controller 240) for obtaining biometric information of the person at a time of exit of the person; time-information storage means (e.g., the entry/exit time database 292 or the user scheduler 293) for storing an entry time representing the time when the first biometric-information obtaining means obtained the biometric information and an exit time representing the time when the second biometric-information obtaining means obtained the biometric information, in such a manner that the entry time and the exit time are associated with the person relevant to the biometric information; biometric-information storage means (e.g., the authentication dictionary 291) for storing biometric information used for authentication; matching score calculating means (e.g., the comparing unit 213) for calculating a matching score representing a degree of similarity between the biometric information stored in the biometric-information storage means and the biometric information obtained by the first biometric-information obtaining means; current-time obtaining means (e.g., the current-time obtaining unit 214) for obtaining a current time; threshold setting means (e.g., the threshold setting unit 215) for setting a threshold used for authentication on the basis of the obtained current time and on the basis of consistency between the entry time and the exit time stored in the time-information storage means in association with the person relevant to the biometric information obtained by the first biometric-information obtaining means; authentication-result determining means (e.g., the authentication-result determining unit 216) for determining success or failure of authentication regarding the biometric information obtained by the first biometric-information obtaining means, on the basis of the calculated matching score and the set threshold; and entry permitting means (e.g., the system controller 220) for permitting entry of the person relevant to the biometric information obtained by the first biometric-information obtaining means if the authentication regarding the obtained biometric information is determined as successful. According to the third embodiment, there is also provided a processing method for the entry-and-exit management apparatus, and a program for causing a computer to execute the processing method. Accordingly, a matching score representing a similarity between the biometric information stored in the biometric-information storage means and the biometric information obtained by the first biometric-information obtaining means is calculated, a threshold used for authentication is set on the basis of the obtained current time and on the basis of consistency between the entry time and the exit time associated with the person relevant to the biometric information obtained by the first biometric-information obtaining means; success or failure of authentication regarding the biometric information obtained by the first biometric-information obtaining means is determined, and entry of the person relevant to the biometric information obtained by the first biometric-information obtaining means is permitted if the authentication regarding the obtained biometric information is determined as successful.

According to a fourth embodiment of the present invention, there is provided an entry management system (e.g., an entry/exit management system 100) including a biometric-information obtaining apparatus (e.g., an image pickup apparatus 111) that obtains biometric information of a person at a time of entry of the person and a door opening and closing apparatus (e.g., a door opening/closing apparatus 130) that opens and closes a door provided at an entrance. The entry management system includes time-information storage means (e.g., the entry/exit time database 292 or the user scheduler 293) for storing a reference time used for authentication; biometric-information storage means (e.g., the authentication dictionary 291) for storing biometric information used for authentication; matching-score calculating means (e.g., the comparing unit 213) for calculating a matching score representing a degree of similarity between the biometric information stored in the biometric-information storage means and the obtained biometric information; current-time obtaining means (e.g., the current-time obtaining unit 214) for obtaining a current time; threshold setting means (e.g., the threshold setting unit 215) for setting a threshold used for authentication, on the basis of the obtained current time and the reference time stored in the time-information storage means; authentication-result determining means (e.g., the authentication-result determining unit 216) for determining success or failure of authentication regarding the obtained biometric information, on the basis of the calculated matching score and the set threshold; and door opening and closing control means (e.g., a door opening/closing controller 260) for controlling the door opening and closing apparatus so that the door is opened if the authentication regarding the obtained biometric information is determined as successful. According to the fourth embodiment, there is also provided a processing method for the entry management system, and a program for causing a computer to execute the processing method. Accordingly, a matching score representing a similarity between the biometric information stored in the biometric-information storage means and the obtained biometric information is calculated, a threshold used for authentication is set on the basis of the current time and the reference time, success or failure of authentication regarding the obtained biometric information is determined on the basis of the calculated matching score and the set threshold, and the door provided at the entrance is opened if the authentication is determined as successful.

According to a fifth embodiment of the present invention, there is provided an entry-and-exit management system (e.g., the entry/exit management system 100) including a first biometric-information obtaining apparatus (e.g., the image pickup apparatus 111) that obtains biometric information of a person at a time of entry of the person, a second biometric-information obtaining apparatus (e.g., an image pickup apparatus 112) that obtains biometric information of the person at a time of exit of the person, and a door opening and closing apparatus (e.g., the door opening/closing apparatus 130) that opens and closes a door provided at an entrance. The entry-and-exit management system includes time-information storage means (e.g., the entry/exit time database 292 or the user scheduler 293) for storing an entry time representing the time when the first biometric-information obtaining apparatus obtained the biometric information and an exit time representing the time when the second biometric-information obtaining apparatus obtained the biometric information, in such a manner that the entry time and the exit time are associated with the person relevant to the biometric information; biometric-information storage means (e.g., the authentication dictionary 291) for storing biometric information used for authentication; matching score calculating means (e.g., the comparing unit 213) for calculating a matching score representing a degree of similarity between the biometric information stored in the biometric-information storage means and the biometric information obtained by the first biometric-information obtaining apparatus; current-time obtaining means for obtaining a current time (e.g., the current-time obtaining unit 214); threshold setting means (e.g., the threshold setting unit 215) for setting a threshold used for authentication on the basis of the obtained current time and on the basis of consistency between the entry time and the exit time stored in the time-information storage means in association with the person relevant to the biometric information obtained by the first biometric-information obtaining apparatus; authentication-result determining means (e.g., the authentication-result determining unit 216) for determining success or failure of authentication regarding the biometric information obtained by the first biometric-information obtaining apparatus, on the basis of the calculated matching score and the set threshold; and door opening and closing control means (e.g., the door opening/closing controller 260) for controlling the door opening and closing apparatus so that the door is opened if the authentication regarding the biometric information obtained by the first biometric-information obtaining apparatus is determined as successful. According to the fifth embodiment, there is also provided a processing method for the entry-and-exit management system, and a program for causing a computer to execute the processing method. Accordingly, a matching score representing a similarity between the biometric information stored in the biometric-information storage means and the biometric information obtained by the first biometric-information obtaining means is calculated, a threshold used for authentication is set on the basis of the obtained current time and on the basis of consistency between the entry time and the exit time associated with the person relevant to the biometric information obtained by the first biometric-information obtaining means; success or failure of authentication regarding the biometric information obtained by the first biometric-information obtaining means is determined, and the door provided at the entrance is opened if the authentication is determined as successful.

According to these embodiments of the present invention, it is possible to improve convenience while maintaining security.

BRIEF DESCRIPTION OF THE DRAWINGS

FIGS. 6A and 6B are tables showing time-of-coming-home information and average-time-of-coming-home information recorded in an entry/exit time database;

FIGS. 11A and 11B are tables showing time-of-leaving/coming-home information and average-time-of-leaving/coming-home information recorded in the entry/exit time database;

DESCRIPTION OF THE PREFERRED EMBODIMENTS

Now, an embodiment of the present invention will be described in detail with reference to the drawings.

Figure 1:
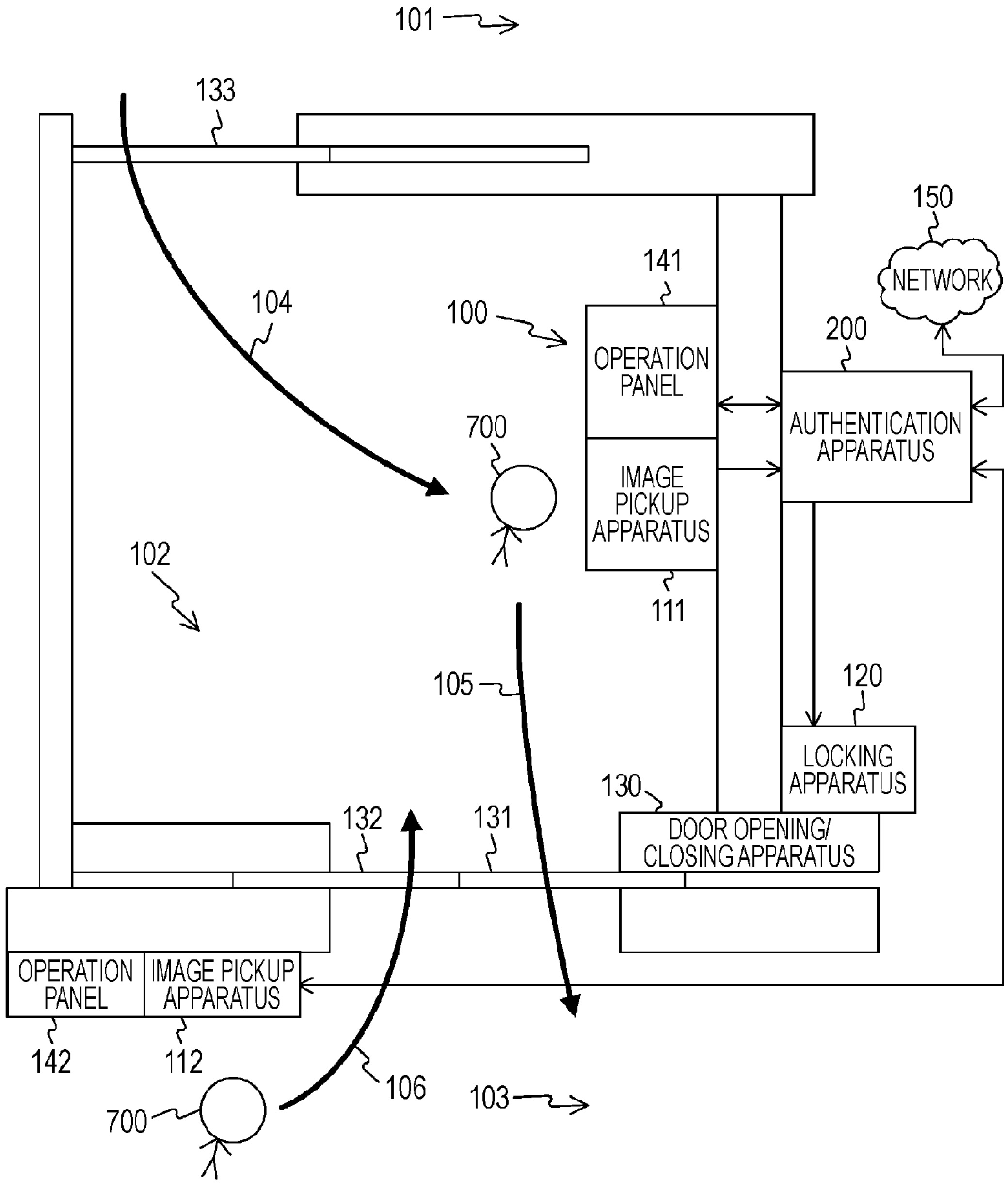
FIG. 1 is a block diagram showing an example configuration of an entry/exit management system including an authentication apparatus according to an embodiment of the present invention.

FIG. 1 is a block diagram showing an example configuration of an entry/exit management system 100 including an authentication apparatus 200 according to an embodiment of the present invention. The entry/exit management system 100 includes image pickup apparatuses 111 and 112, a locking apparatus 120, a door opening/closing apparatus 130, operation panels 141 and 142, and an authentication apparatus 200. The authentication unit 200 is connected to a communication network 150, such as the Internet. This embodiment will be described in the context of an example where the entry/exit management system 100 is installed at an entrance of a collective housing in which a person 700 lives. FIG. 1 schematically shows a top view of the entrance where the entry/exit management system 100 is installed. The functional configurations of the components of the entry/exit management system 100 will be described later in detail with reference to FIG. 2.

In the collective housing in which the person 700 lives, a door 133 separating a lobby 102 of the building from outside 101, and doors 131 and 132 separating the lobby 102 from inside 103 are provided. The door 133 can be opened and closed freely by persons going therethrough. The doors 131 and 132 are controlled to open or close by the entry/exit management system 100, so that free entry from entering from the side of the lobby is not allowed. More specifically, the doors 131 and 132 are locked or unlocked by the locking apparatus 120, and are automatically opened or closed by the door opening/closing apparatus 130.

When a person enters from the outside 101 to the inside 103 of the collective housing, the person has to open the door 133 to enter the lobby 102, and undergo personal authentication using the operation panel 141 and the image pickup apparatus 111 provided in the lobby 102. Upon successful authentication, the doors 131 and 132 open automatically so that the person can enter the inside 103. As an example, the embodiment being described herein uses an authentication method in which a human face is used as biometric information.

Now, a case where the person 700 enters the inside 103 from the outside 101 will be described. For example, as indicated by an arrow 104, the person 700 manually opens the door 133 to enter the lobby 102 from the outside 101, and comes in front of the image pickup apparatus 111. Then, the image pickup apparatus 111 picks up an image of the face of the person 700. The authentication apparatus 200 executes authentication on the basis of the image of the face of the person 700.

Upon successful authentication by the authentication apparatus 200 based on the image of the face of the person 700 picked up by the image pickup apparatus 111, the locking apparatus 120 unlocks the doors 131 and 132 under the control of the authentication apparatus 200, and the door opening/closing apparatus 130 automatically opens the doors 131 and 132. Thus, as indicated by an arrow 105, the person 700 can enter the inside 103 from the lobby 102. On the other hand, if the authentication fails, the doors 131 and 132 do not open, so that the person A is not allowed to enter the inside 103 from the lobby 102.

Conversely, when the person 700 moves from the inside 103 to the outside 101, for example, as indicated by an arrow 106, the person 700 comes in front of the doors 131 and 132. Then, a person detection sensor (not shown) detects the presence of the person 700, and the doors 131 and 132 open automatically. Then, as indicated by the arrow 106, the person 700 enters the lobby 102 through the doors 131 and 132, and opens the door 133 to move from the lobby 102 to the outside 101.

Furthermore, in this embodiment, each time the person 700 goes out from the inside 103 to the lobby 102, the time of exit of the person 700 is recorded using the image pickup apparatus 112 or the operation panel 142, so that the authentication apparatus 200 can execute authentication on the basis of the time of exit. An example of recording the time of exit using the image pickup apparatus 112 or the operation panel 142 will be described mainly with reference to FIGS. 11 to 13.

Next, an example of the functional configuration of the entry/exit management system 100 including the authentication apparatus 200 will be described in detail with reference to the drawings.

Figure 2:
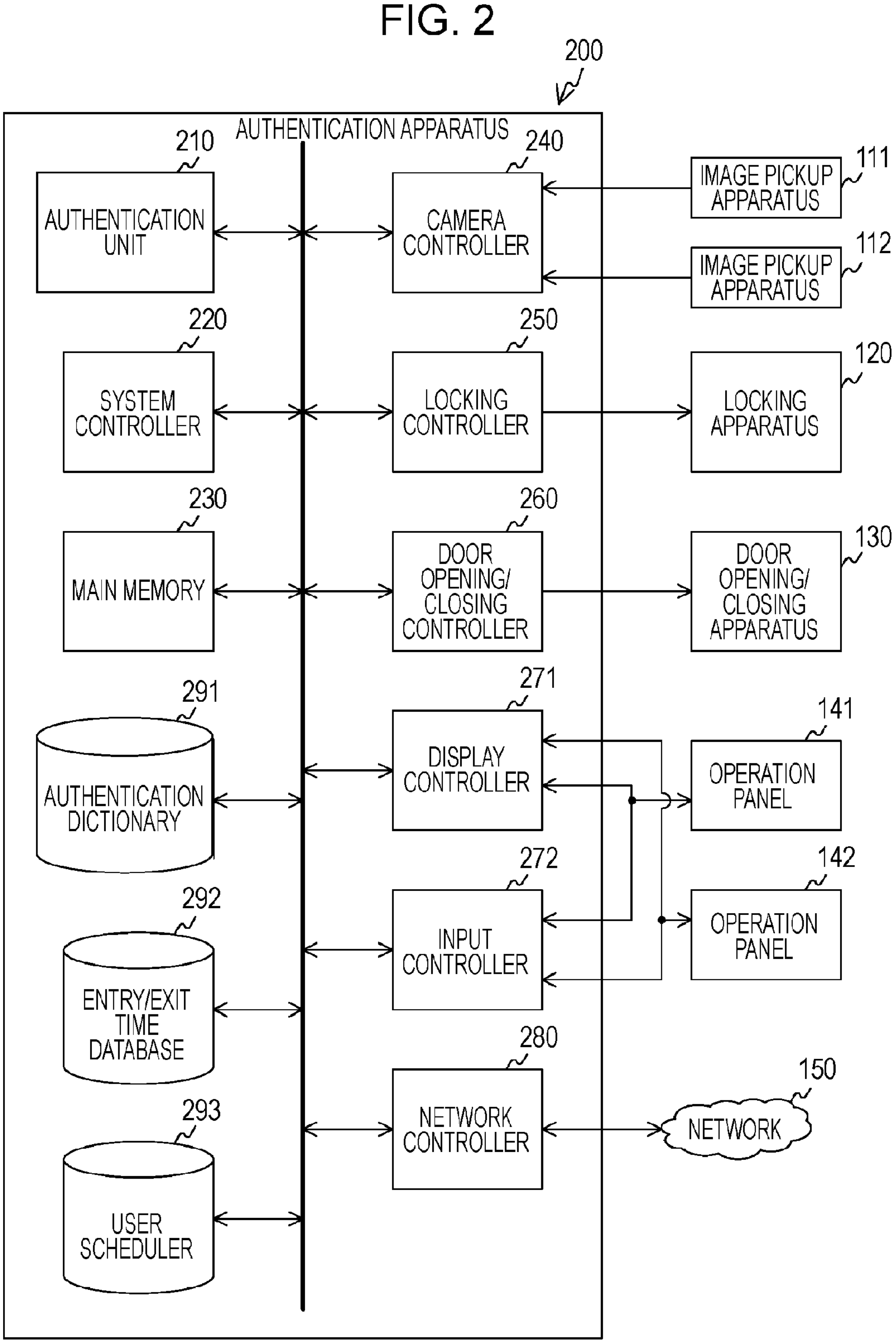
FIG. 2 is a block diagram showing an example functional configuration of the entry/exit management system including the authentication apparatus.

FIG. 2 is a block diagram showing an example of the functional configuration of the entry/exit management system 100 including the authentication apparatus 200 according to this embodiment. As described earlier, the entry/exit management system 100 includes the image pickup apparatuses 111 and 112, the locking apparatus 120, the door opening/closing apparatus 130, the operation panels 141 and 142, and the authentication apparatus 200. The authentication apparatus 200 includes an authentication unit 210, a system controller 220, a main memory 230, a camera controller 240, a locking controller 250, a door opening/closing controller 260, a display controller 271, an input controller 272, a network controller 280, an authentication dictionary 291, an entry/exit time database 292, and a user scheduler 293.

Each of the imaging apparatuses 111 and 112 includes an image pickup device, such as a charge coupled device (CCD), and outputs an image of an object picked up by the image pickup device to the camera controller 240. The image pickup apparatuses 111 and 112 pick up images of objects under the control of the camera controller 240.

The locking apparatus 120 locks or unlocks the doors 131 and 132 under the control of the locking controller 250. That is, usually, the locking apparatus 120 keeps the doors 131 and 132 locked. However, upon successful authentication of a person by the authentication apparatus 200, the locking apparatus 120 unlocks the doors 131 and 132 under the control of the locking controller 250. Furthermore, after the person passes through the doors 131 and 132 and the door opening/closing apparatus 130 closes the doors 131 and 132, the locking apparatus 120 locks the doors 131 and 132 under the control of the locking controller 250. Also when a person goes out from the inside 103 to the lobby 102, the locking apparatus 120 unlocks the doors 131 and 132 under the control of the locking controller 250.

The door opening/closing apparatus 130 opens or closes the doors 131 and 132 under the control of the door opening/closing controller 260. Usually, since the locking apparatus 120 keeps the doors 131 and 132 locked, the door opening/closing apparatus 130 keeps the doors 131 and 132 closed. Upon successful authentication of a person by the authentication apparatus 200, the locking apparatus 120 unlocks the doors 131 and 132, and the door opening/closing apparatus 130 opens the doors 131 and 132. Furthermore, after the person passes through the doors 131 and 132, the door opening/closing apparatus 130 closes the doors 131 and 132. Also when a person goes out from the inside 103 to the lobby 102, the door opening/closing apparatus 130 opens the doors 131 and 132 under the control of the door opening/closing controller 260.

Each of the operation panels 141 and 142 is a touch panel in which an operation accepting unit and a display unit are integrated. Each of the operation panels 141 and 142 displays various operation screens and operation keys under the control of the display controller 271.

Furthermore, upon accepting input of an operation through pressing of a displayed key or the like, each of the operation panels 141 and 142 outputs information representing the input operation to the input controller 272. For example, each of the operation panels 141 and 142 displays numeric keys for inputting a user ID, and displays messages as needed, such as "Please place your face in front of the image pickup apparatus for authentication.", "Authentication successful. The door will open. Please enter.", or "Authentication failed. To try again, please have an image of your face picked up by the image pickup apparatus."

The authentication unit 210 executes an authentication process based on a face image picked up by the image pickup apparatus 111 or 112. The authentication process will be described later in detail with reference to FIG. 3.

The system controller 220 controls the authentication apparatus 200 as a whole.

The main memory 230 stores face images picked up by the image pickup apparatuses 111 and 112, and outputs the face images stored therein to the authentication unit 210.

The camera controller 240 controls the image pickup apparatus 111 or 112 that picks up an image of a subject, according to an instruction from the system controller 220. Upon receiving an image of a subject picked up by the image pickup apparatus 111 or 112, the camera controller 240 outputs the image of the subject to the main memory 230.

The locking controller 250 controls the locking apparatus 120 according to instructions from the system controller 220.

The door opening/closing controller 260 controls the door opening/closing apparatus 130 according to instructions from the system controller 220.

The display controller 271 controls display on the operation panels 141 and 142 according to instructions from the system controller 220.

The input controller 272 controls input of operations accepted through the operation panel 141 or the operation panel 142, according to instructions from the system controller 220.

The network controller 280 is connected to the network 150, and controls communication performed via the network 150, according to instructions from the system controller 220.

The authentication dictionary 291 stores template images used for authentication. That is, face image data that serves as biometric information of users (registrants) is stored as template images in the authentication dictionary 291. The template images registered in the authentication dictionary 291 will be described later in detail with reference to FIG. 5.

The entry/exit time database 292 is a database in which entry/exit times of individual users are recorded. The times and other information recorded in the entry/exit time database 292 will be described later mainly with reference to FIGS. 6A and 6B.

The user scheduler 293 records schedules input by users, such as scheduled time of leaving home and scheduled time of coming home. In the user scheduler 293, values corresponding to input operations accepted via the operation panel 141 or 142, values received via the network 150, or the like are recorded. The time and other information recorded by the user scheduler 293 will be described later in detail mainly with reference to FIG. 7.

Next, the authentication process executed by the authentication unit 210 will be described in further detail.

Figure 3:
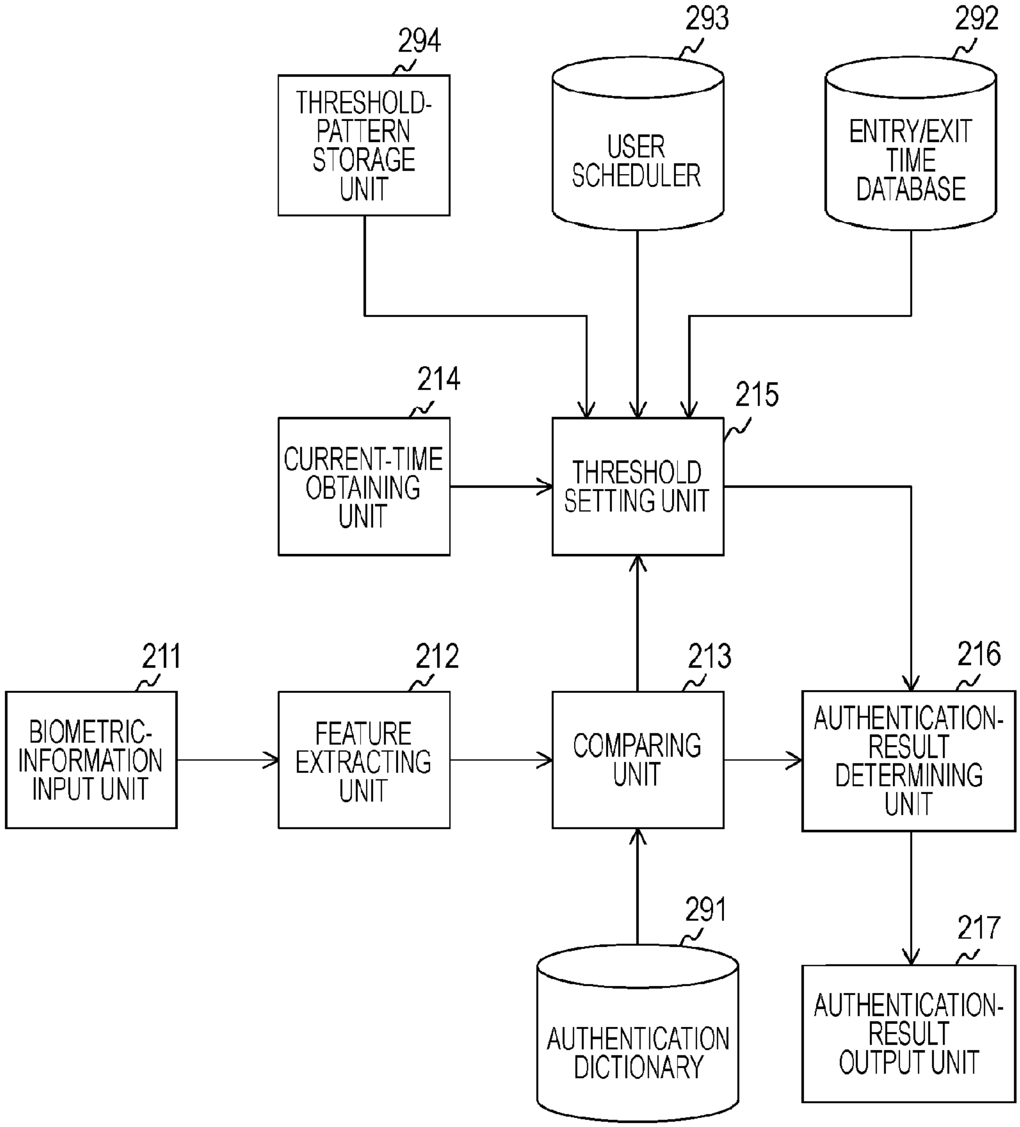
FIG. 3 is a block diagram showing an example functional configuration regarding an authentication process executed by the authentication apparatus.

FIG. 3 is a block diagram showing an example functional configuration relating to the authentication process executed by the authentication apparatus 200 according to this embodiment. The authentication apparatus 200 includes a biometric-information input unit 211, a feature extracting unit 212, a comparing unit 213, a current-time obtaining unit 214, a threshold setting unit 215, an authentication-result determining unit 216, an authentication-result output unit 217, the authentication dictionary 291, the entry/exit time database 292, the user scheduler 293, and a threshold-pattern storage unit 294. The authentication dictionary 291, the entry/exit time database 292, and the user scheduler 293 individually correspond to those shown in FIG. 2.

The biometric-information input unit 211 receives input of a face image that serves as biometric information used for authentication, and outputs the input face image to the feature extracting unit 212. As the face image, a face image picked up by the image pickup apparatus 111 or 112 is input.

The feature extracting unit 212 executes various types of image analysis regarding the face image output from the biometric-information input unit 211 to extract a feature of the face image, and outputs the feature to the comparing unit 213. The feature refers to a value representing a feature regarding parts of the face image, used to recognize the positional relationship or shapes of parts of the face, such as the eyes, nose, mouse, and eyebrows. For example, the feature is used to determine a degree of similarity between face images. The feature is obtained on the basis of values of colors, luminance, or the like.

The comparing unit 213 compares the face-image feature output from the feature extracting unit 212 with features extracted from the individual template images stored in the authentication dictionary 291, and selects the template image having the highest degree of similarity with the face image input to the biometric-information input unit 211 as a subject of authentication. Then, the comparing unit 213 calculates a matching score representing the degree of similarity on the basis of the face-image feature output from the feature extracting unit 212 and the feature extracted from the selected template image, and outputs the matching score to the authentication-result determining unit 216 and outputs identification information (user ID) corresponding to the selected template image to the threshold setting unit 215.

The current-time obtaining unit 214 obtains a current time and outputs the current time to the threshold setting unit 215.

The threshold setting unit 215 obtains scheduled-time of-coming-home information stored in the user scheduler 293 in association with the user ID output from the comparing unit 213, average-time-of-coming-home information stored in the entry/exit time database 292 in association with the user ID, or the like, and sets a threshold used for authentication on the basis of the obtained information and current time using a threshold pattern stored in the threshold-pattern storage unit 294. Then, the threshold setting unit 215 outputs the threshold that has been set to the authentication-result determining unit 216. The method of setting the threshold will be described later in detail mainly with reference to FIG. 8.

The authentication-result determining unit 216 determines whether the authentication based on the face image associated with the matching score output from the comparing unit 213 has succeeded or failed, on the basis of whether the matching score exceeds the threshold output from the threshold setting unit 215, and outputs the result to the authentication-result output unit 217.

The authentication-result output unit 217 outputs the result of the authentication determined by the authentication-result determining unit 216.

The threshold-pattern storage unit 294 stores a threshold pattern, and outputs the threshold pattern to the threshold setting unit 215. The threshold pattern will be described later in detail mainly with reference to FIG. 8.

Next, an example method of authentication of a face image will be described in detail with reference to the drawings.

Figure 4:
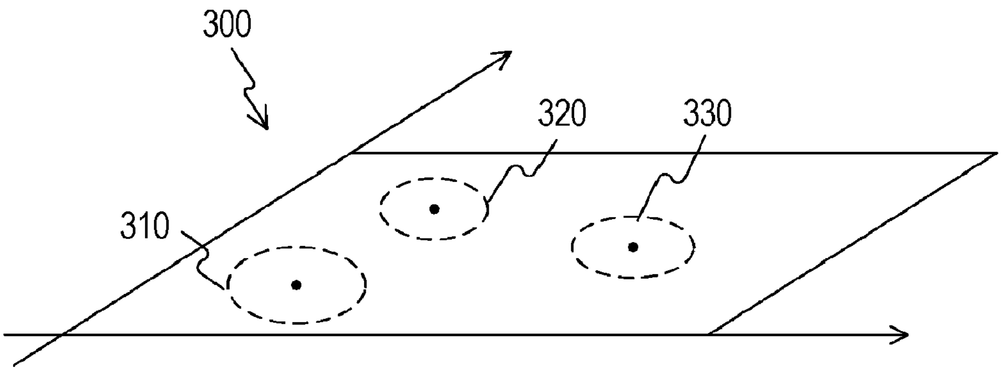
FIG. 4 is a diagram schematically showing a feature space to which a face image picked up by an image pickup apparatus is mapped.

FIG. 4 is a diagram schematically showing a feature space 300 to which a face image picked up by the image pickup apparatus 111 is mapped (i.e., a face space). The method of face authentication in this example is based on principal component analysis (PCA). (For reference, see Matthew A. Turk and Alex P. Pentland, "Face Recognition Using Eigenfaces", IEEE (1991).

In PCA-based face authentication, a face image picked up by the image pickup apparatus 111 is mapped to the feature space 300 to execute face authentication. That is, the face image picked up by the image pickup apparatus 111 is mapped to the feature space 300 so that the face image is represented as a point in the feature space 300 (e.g., on a plane in the case of a two-dimensional feature space). It is known that, with a feature space having a sufficiently large dimensionality, face images of the same person are mapped in a local area of the feature space in a concentrated manner. Using this characteristic, it is possible to determine on the basis of a distance in the feature space 300 whether a person under authentication is a registrant.

FIG. 4 shows an example where three persons have been registered in the authentication dictionary 291, individually corresponding to face regions 310, 320, and 330. Although multiple images of the face of a person picked up under different conditions are mapped to different points in the feature space 300, the points are concentrated in a local area compared with the entire feature space 300. Thus, by defining a region corresponding to the same person so that the area has a certain size, it is possible to absorb variation in imaging conditions.

Now, consider a case where the face region 310 corresponds to face images of the person 700, and face images of a large number of persons including face images of the person 700 are prepared. Then, all the face images prepared are mapped to the feature space 300. In this case, PCA-based face authentication is executed according to the principle that face images mapped within the face region 310 are face images of the person 700. However, as the face region 310 is defined to be smaller in the feature space 300, the possibility of recognizing a face image of the person 700 as a face image of another person increases. Conversely, as the face region 310 is defined to be larger in the feature space 300, the possibility of recognizing a face image of another person as a face image of the person 700 increases. The threshold used in this embodiment is a value specifying the size of the face region 310.

For example, in a case where multiple face images of the person 700 have been mapped to the feature space 300, a representative face image, i.e., a face image mapped to the barycenter or nearest to the barycenter, is considered as a prototype for the person 700. In this case, a region including a sufficiently large number of face images of the person 700 while not including a substantial number of face images of other persons (e.g., the face region 310) can be represented as a hypersphere centered at the point corresponding to the prototype. That is, a face region for a specific person can be represented by the interior of a hypersphere centered at a point corresponding to the prototype for the person and having a radius with a length corresponding to the magnitude of the threshold. Assuming that a prototype is determined appropriately, the accuracy of authentication depends on the threshold.

That is, in the case of PCA-based face authentication, success or failure of authentication is determined according to whether the matching score calculated by the comparing unit 213 exceeds the threshold set by the threshold setting unit 215.

Next, the relationship between the false acceptance rate (FAR) and the false rejection rate (FRR) in personal authentication based on biometric information will be described.

The performance of biometric authentication can be measured in terms of two criteria; namely, the false rejection rate (FRR) and the false acceptance rate (FAR). (For reference, see Alyson G. Wilson, Gregory D. Wilson, David H. Olwell, "Statistical Methods in Counterterrorism", pp. 41-97.) The FRR is the rate of incorrectly rejecting a registrant, and the FAR is the rate of incorrectly accepting another person as a registrant. The FRR and FAR are in a relationship of tradeoff, and are both closely related to the threshold.

Now, let the threshold be denoted by $\tau$, the distribution density of matching of a registrant (authentic) by $fA(x)$, and the distribution density of matching of an impostor by gI(x). Then, the FRR and FAR can be defined as expressed in equations (1) and (2) below:

$$FRR = P(T \leqq \tau | T \in \text{authentic}) = \int_{-\infty}^{\tau} f_A(x)\,dx \quad (1)$$

$$FAR = P(T > \tau | T \in \text{impostor}) = \int_{\tau}^{\infty} g_I(x)\,dx \quad (2)$$

where T denotes a matching score.

Since Gaussian distributions are not actually presumed, however, equations (1) and (2) are rewritten as equations (3) and (4) below:

$$pFRR = \frac{\#(T \leqq \tau | T \in \text{authentic})}{\#\text{authentic}} \quad (3)$$

$$pFAR = \frac{\#(T > \tau | T \in \text{impostor})}{\#\text{impostor}} \quad (4)$$

where pFRR denotes an estimated value of the FRR, and pFAR denotes an estimated value of the FAR. Furthermore, #authentic as the denominator of equation (3) denotes an estimated number of registrants (authentic), and the numerator of equation (3) represents an estimated number of registrants for whom the matching score does not exceed the threshold. Furthermore, #imposter as the denominator of equation (4) denotes an estimated number of impostors, and the numerator of equation (4) represents an estimated number of impostors for whom the matching score exceeds the threshold.

In a detection error tradeoff (DET) curve representing the relationship between the FRR calculated according to equation (1) and the FAR calculated according to equation (2), generally, there exists a tendency that the FRR increases as the FAR decreases.

Thus, generally, in places where strict security is desired, the threshold is chosen to be high so that the FAR becomes low. As a result, the FRR becomes high, that is, the probability of a registrant being rejected increases. This could diminish the convenience of the system.

In view of this problem, in this embodiment, time-based information is used to change the threshold $\tau$ adaptively. This serves to set the FAR and FRR appropriately.

For example, in a case where authentication of a user for entry is executed soon after an exit of the user, it is highly probable that the person is the authentic user. Thus, for a certain time range from an exit of a user, the threshold for the user is lowered. Accordingly, a user who exits and returns soon is likely to be allowed to enter. On the other hand, if authentication for a user is executed after elapse of a certain time since an exit of the user, the threshold for the user is increased. This serve to achieve a high level of security.

By adaptively controlling the threshold as described above, it is possible to maintain security without compromising convenience.

As methods for determining the identity of a person, as well as the PCA-based method, for example, a method based on linear discrimination, and a method that employs a neural network are known. Also in these methods, the accuracy of authentication can be determined according to the threshold set to the classifier.

Figure 5:
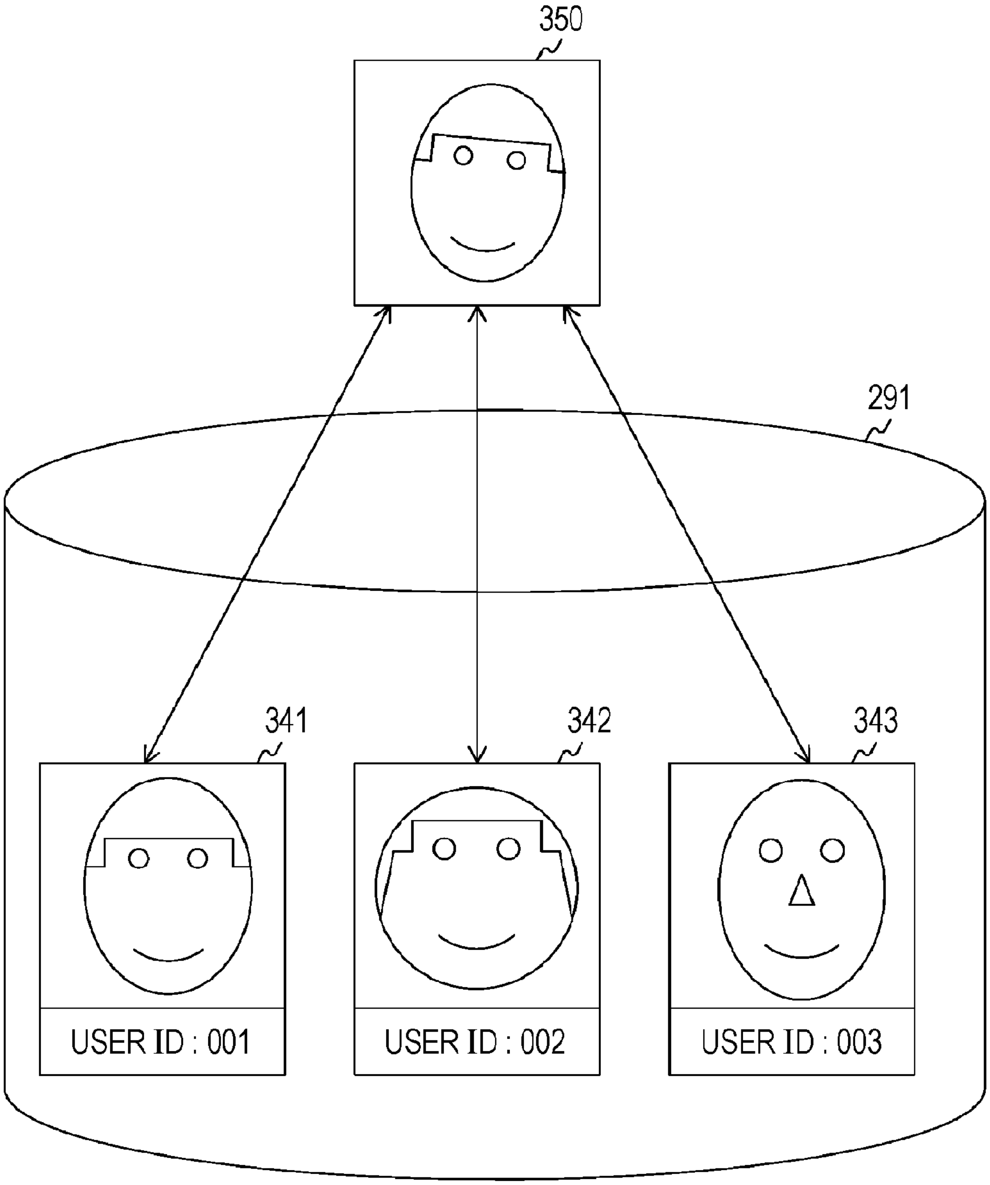
FIG. 5 is a diagram schematically showing template images registered in an authentication dictionary and a face image input to an authentication unit.

FIG. 5 is a diagram schematically showing template images 341 to 343 registered in the authentication dictionary 291 and a face image 350 input to the authentication unit 210.

For example, as shown in FIG. 5, each person living in the collective housing shown in FIG. 1 has a user ID, and for each user ID, a template image representing a face image having a high-quality feature is registered. For example, the template images 341 to 343 are registered correspondingly to user IDs "001" to "003". In this case, for example, let it be supposed that the user ID assigned to the person 700 living in the collective housing shown in FIG. 1 is "001", and user IDs assigned to other persons living in the collective housing are "002" and "003". When the comparing unit 213 selects a template image having the highest degree of similarity with the face image 350 input to the authentication unit 210, the feature of the face image 350 is compared with the features of the individual template images 341 to 343, and a template image having the highest degree of similarity is selected on the basis of the results of comparison. For example, the template image 341 is selected as a template image having the highest degree of similarity with the face image 350. In this case, a matching score is calculated on the basis of the feature of the face image 350 and the feature of the template image 341, and the matching score is output to the authentication-result determining unit 216. Furthermore, the user ID "001" corresponding to the template image 341 is output to the threshold setting unit 215.

FIG. 6A is a table showing time-of-coming-home information recorded in the entry/exit time database 292. FIG. 6B is a table showing average-time-of-coming-home information recorded in the entry/exit time database 292.

In the time-of-coming-home information 401 and the average-time-of-coming-home information 402, for each user ID assigned to a person living in the collective housing shown in FIG. 1, times when the person came home are managed. For example, let it be supposed that the user ID assigned to the person 700 living in the collective housing shown in FIG. 1 is "001", and user IDs assigned to other persons living in the collective housing are "002", "003", and so forth.

In the time-of-coming-home information 401, when authentication of the face of a person picked up by the image pickup apparatus 111 succeeds, the date and time of the successful authentication is recorded in association with the user ID of the person. For example, "2007/1/14" is recorded in the date field, and "11:20" is recorded in the time field. In a case where exit and entry occur a plurality of times on one day, for each entry, the time of coming home is recorded. For example, on the day "2007/14/2007", "11:20" is recorded as "coming home 1", and "19:00" is recorded as "coming home 2". Furthermore, although not shown in FIG. 6A, the face image used for the successful authentication is stored in the entry/exit time database 292 together with the date and time of the successful authentication.

In the average-time-of-coming-home information 402, for each user, an average time of coming home on each weekday is recorded. The average time of coming home is a statistical entry time calculated on the basis of past statistical data. The average-time-of-coming-home information 402 is calculated on the basis of times of coming home recorded in the time-of-coming-home information 401. For example, regarding the person 700 (having the user ID "001"), "20:12" is recorded for Monday, "20:03 is recorded for Tuesday, "20:05" is recorded for Wednesday, "19:56" is recorded for Thursday, and "20:32" is recorded for Friday. In this example, since times of coming home tend to vary considerably on weekends, average times of coming home are calculated and recorded only for weekdays. Furthermore, since times of coming home tend to very among different days of week on weekdays, an average time of coming home for each day of week is calculated and recorded. Instead of average times of coming home, values calculated on the basis of a frequency distribution of times of coming home may be used, or values obtained through learning may be used.

Figures 7, 8:
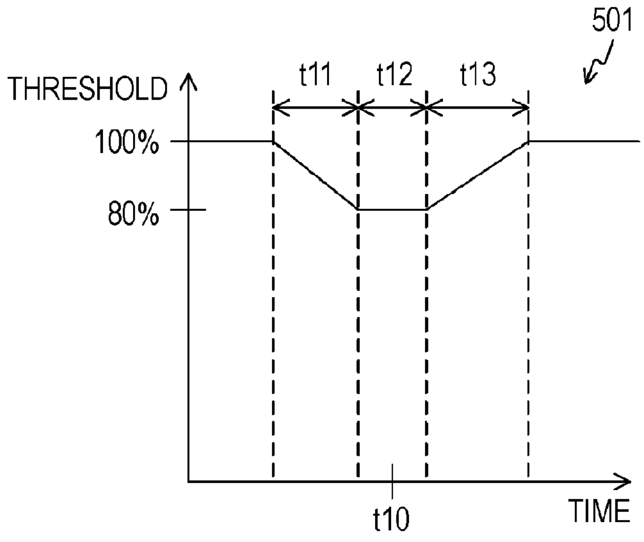
FIG. 7 is a table showing scheduled-time-of-coming-home information recorded in a user scheduler.
FIG. 8 is a graph showing a threshold pattern stored in a threshold-pattern storage unit.

FIG. 7 is a table showing scheduled-time-of-coming-home information 411 recorded in the user scheduler 293. Similarly to the time-of-coming-home information 401 and the average-time-of-coming-home information 402 shown in FIGS. 6A and 6B, in the scheduled-time-of-coming-home information 411, for each user ID assigned to a person living in the collective housing, times relevant to the person are managed.

The scheduled-time-of-coming-home information 411 represents a scheduled time of coming home that is recorded on the basis of a scheduled time of coming home input by a person living in the collective housing via the operation panel 141 or 142. That is, the scheduled-time-of-coming-home information 411 represents a preset scheduled entry time. For example, if a person leaves home a plurality of times on one day, a plurality of scheduled times of coming home are recorded. In the case of a day for which no scheduled time of coming home is input by the user, no scheduled time of coming home is recorded.

FIG. 8 is a diagram showing a threshold pattern 501 stored in the threshold-pattern storage unit 294. The threshold pattern 501 is used to set a threshold for authentication of a user on the basis of an average time of coming home recorded in the average-time-of-coming-home information 402 or a scheduled time of coming home recorded in the scheduled-time-of-coming-home information 411.

The threshold pattern 501 is composed of segments for time ranges t11 to t13. The time range t12 includes a reference time t10, and has a length of, for example, 6 minutes. The time range t11 immediately precedes the time range t12, and has a length of, for example, 10 minutes. The time range t13 immediately succeeds the time range 12, and has a length of, for example, 15 minutes. For example, the threshold decreases from 100% to 80% in the time range t11, the threshold is maintained at 80% in the time range t12, and the threshold increases from 80% to 100% in the time range t13.

For example, when a threshold for authentication is determined on the basis of a scheduled time of coming home "21:00" recorded in the scheduled-time-of-coming-home information 411, the scheduled time of coming home "21:00" is considered as the reference time t10. If the current time at the time of authentication is included in the time range t12, 80% is used as a threshold for authentication. On the other hand, if the current time at the time of authentication is included in the time range t11 or t13, a value in the range of 80% to 100% is set as a threshold for authentication in accordance with the current time. If the current time at the time of authentication is included in none of the time ranges t11 to t13, 100% is set as a threshold used for authentication.

As described above, a threshold used for authentication of a user is set on the basis of an average time of coming home recorded in the average-time-of-coming-home information 402 or a scheduled time of coming home recorded in the scheduled-time-of-coming-home information 411. Thus, a threshold can be set suitably in accordance with the behavior of the user. Accordingly, the convenience for the user can be improved while maintaining security.

Next, the operation of the entry/exit management system 100 according to this embodiment will be described with reference to the drawings.

Figure 9:
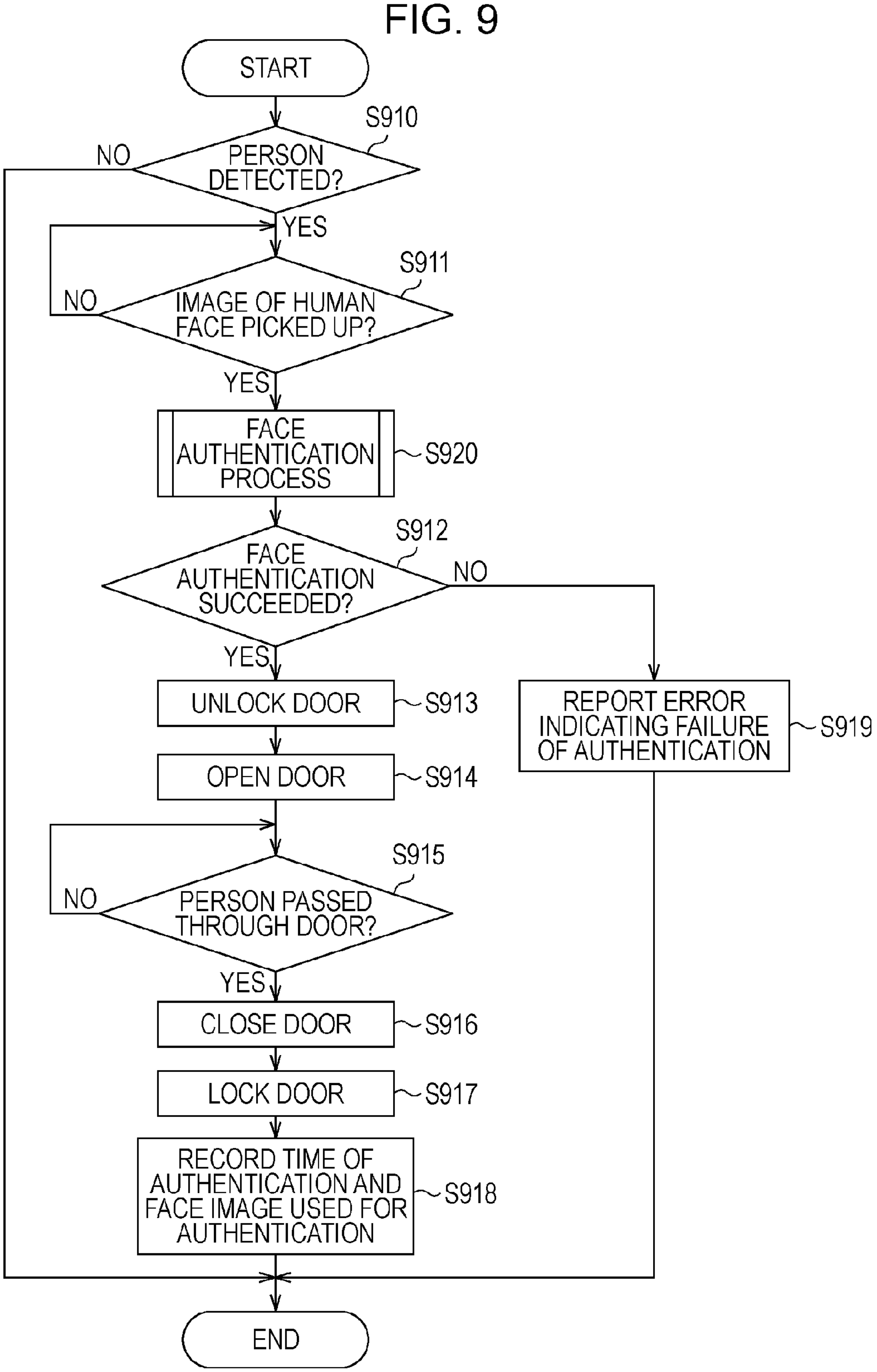
FIG. 9 is a flowchart showing a procedure of an entry management process executed by the entry/exit management system.

FIG. 9 is a flowchart showing a procedure of an entry management process executed by the entry/exit management system 100.

First, it is determined whether the image pickup apparatus 111 has picked up a figure of a person (step S910). That is, it is determined whether a person has been detected. If no person has been detected in step S910, the entry management process comes to an end. On the other hand, if a person has been detected in step S910, it is determined whether the image pickup apparatus 111 has picked up a face of the person (step S911).

If the image pickup apparatus 111 has not picked up an image of the face in step S911, monitoring is continued until the image pickup apparatus 111 picks up an image of the face. On the other hand, if the image pickup apparatus 111 has picked up an image of the face in step S911, the face image that has been picked up is stored in the main memory 230. Then, the face image stored in the main memory 230 is input to the authentication unit 210, and the authentication unit 210 executes an authentication process regarding the input face image (step S920). The face-image authentication process will be described later in detail with reference to FIG. 10.

Then, it is determined as a result of the face authentication process whether the face authentication has ended successfully (step S912). If the face authentication has ended successfully in step S912, the locking apparatus 120 unlocks the doors 131 and 132 under the control of the locking controller 250 (step S913). Then, the door opening/closing apparatus 130 opens the doors 131 and 132 (step S914). Then, a sensor (not shown) determines whether the person has passed through the doors 131 and 132 (step S915). If the person has not passed through the doors 131 and 132 in step S915, monitoring is continued until the person passes through the doors 131 and 132. On the other hand, if the person has passed through the doors 131 and 132 in step S915, the door opening/closing apparatus 130 closes the doors 131 and 132 under the control of the door opening/closing controller 260 (step S916). Then, the locking apparatus 120 locks the doors 131 and 132 under the control of the locking controller 250 (step S917).

Then, the face image used for the successful authentication and the time of the authentication are registered in association with each other in the entry/exit time database 292 (step S918).

If the face authentication fails in step S912 as a result of the face authentication process in step S920, a message indicating the failure of authentication is displayed on the operation panel 141 under the control of the display controller 271 (step S919). Then, the entry management process comes to an end.

Figure 10:
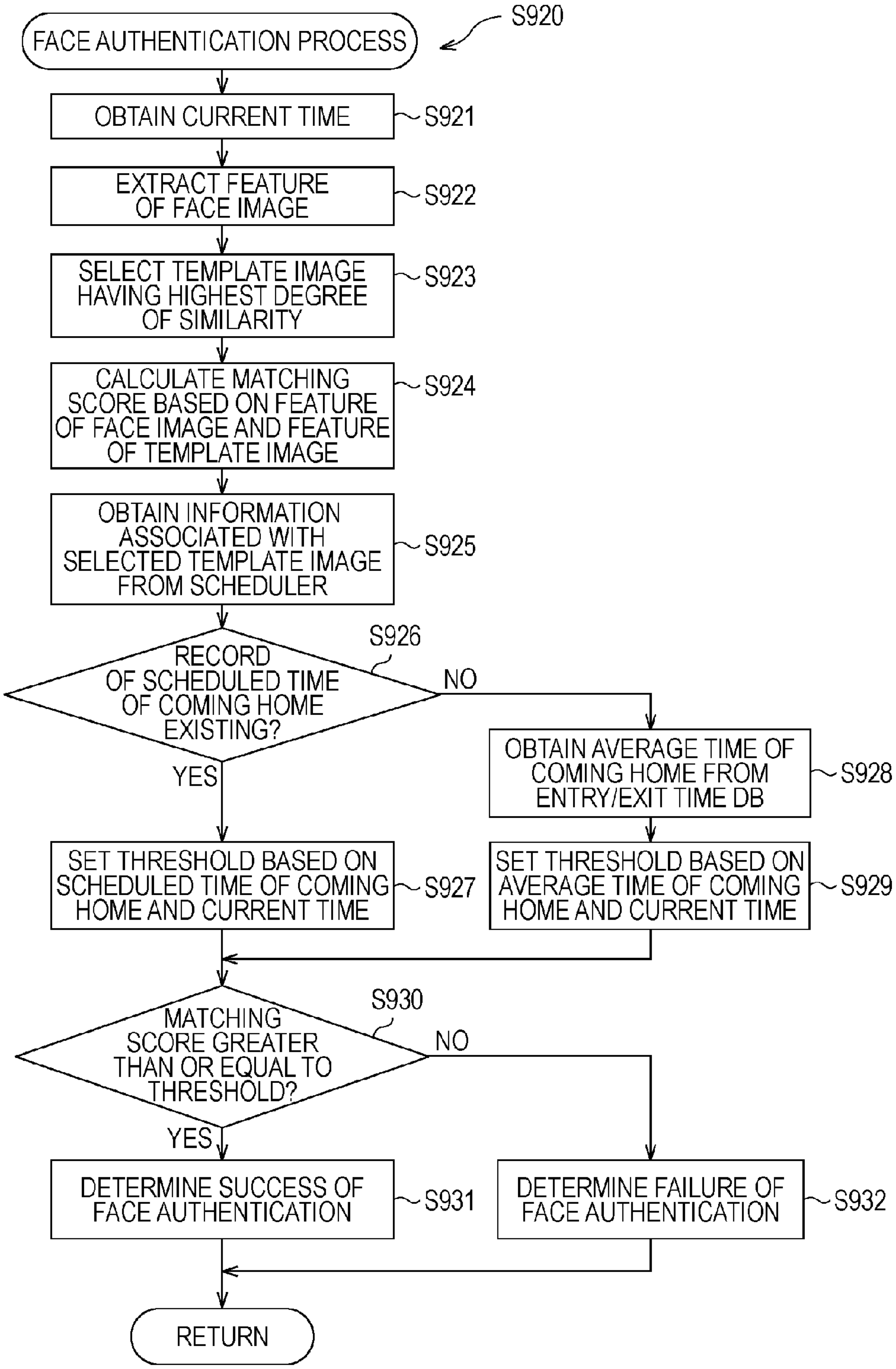
FIG. 10 is a flowchart showing a procedure of step S920 shown in FIG. 9.

FIG. 10 is a flowchart showing the procedure of the face authentication process in the procedure of the entry management process (step S920 shown in FIG. 9) executed by the entry/exit management system 100.

First, the current time is obtained (step S921). Then, a feature of the face image input from the main memory 230 is extracted (step S922). Then, the feature extracted from the input face image is compared with the features of the individual template images stored in the authentication dictionary 291, and a template image having the highest degree of similarity with the face image under authentication is selected (step S923).

Then, a matching score is calculated on the basis of the feature extracted from the input face image and the feature of the selected template image (step S924).

Then, scheduled-time-of-coming-home information stored in the user scheduler 293 in association with the user ID corresponding to the selected template image is obtained (step S925). Then, on the basis of the current time obtained in step S921, it is determined whether a scheduled time of coming home for the current day is included in the obtained scheduled-time-of-coming-home information (step S926). If a scheduled time of coming home for the current day is included in the obtained scheduled-time-of-coming-home information in step S926, a threshold used for authentication is set on the basis of the scheduled time of coming home for the current day included in the obtained scheduled-time-of-coming-home information and on the basis of the current time (step S927). For example, assuming that the scheduled time of coming home for the current day included in the obtained scheduled-time-of-coming-home information is the reference time t10 shown in FIG. 8, if the current time is included in the time ranges t11 to t13, a threshold in the range of 80% to 100% is set in accordance with the current time. On the other hand, if the current time is included in none of the time ranges t11 to t13, a threshold of 100% is set.

On the other hand, if no scheduled time of coming home for the current day is included in the scheduled-time-of-coming-home information obtained from the user scheduler 293 in step S926, an average time of coming home recorded in the entry/exit time database 292 in association with the user ID corresponding to the selected template image is obtained (step S928). Then, on the basis of the average time of coming home for the day of week corresponding to the current day, recorded in the obtained average time of coming home, and on the basis of the current time, a threshold used for authentication is set (step S929). For example, assuming that the average time of coming home for the day of week corresponding to the current day, recorded in the obtained average-time-of-coming-home information, is the reference time t10 shown in FIG. 8, if the current time is included in the time ranges t11 to t13, a threshold in the range of 80% to 100% is set in accordance with the current time. On the other hand, if the current time is included in none of the time ranges t11 to t13, a threshold of 100% is set as for weekends (Saturdays and Sundays), since no average time of coming home is recorded in the average-time-of-coming-home information, for example, a threshold of 100% is set.

Then, it is checked whether the matching score calculated in step S924 is greater than or equal to the threshold set in step S927 or S929 (step S930). If it is determined in step S930 that the matching score calculated in step S924 is greater than or equal to the threshold set in step S927 or S929, it is determined that the authentication of the face corresponding to the face image input from the main memory 230 has ended successfully, and this result is output to the system controller 220 (step S931). On the other hand, it is determined in step S930 that the matching score calculated in step S924 is not greater than or equal to the threshold set in step S927 or S929, it is determined that the authentication of the face corresponding to the face image input from the main memory 230 has ended in a failure, and this result is output to the system controller 220 (step S932).

As described above, it is possible to set a threshold used for authentication on the basis of a scheduled time of coming home for the current day, recorded in the scheduled-time-of-coming-home information obtained from the user scheduler 293. That is, it is possible to set a threshold in accordance with scheduled behavior of a user. More specifically, in a time range in which the scheduled time of coming home and the time of authentication differ considerably so that the user is likely to be not at home, since the probability of the face under authentication being the face of the user is low, a high threshold is set to improve security. Conversely, in a time range in which the scheduled time of coming home and the time of authentication do not differ considerably so that the user is likely to come home, since the probability of the face under authentication being the face of the user is high, a low threshold is set to improve convenience.

On the other hand, if no scheduled time of coming home for the current day is recorded in the scheduled-time-of-coming-home information obtained from the user scheduler 293, it is possible to set a threshold for authentication on the basis of an average time of coming home for the day of week corresponding to the current day, recorded in the average-time-of-coming-home information obtained from the entry/exit time database 292. That is, it is possible to set a threshold on the basis of customary behavior of a user. More specifically, in a time range in which the scheduled time of coming home and the time of authentication differ considerably so that the user is likely to be not at home, since the probability of the face under authentication being the face of the user is low, a high threshold is set to improve security. Conversely, in a time range in which the scheduled time of coming home and the time of authentication do not differ considerably so that the user is likely to come home, since the probability of the face under authentication being the face of the user is high, a low threshold is set to improve convenience.

As described above, it is possible to set a suitable threshold on the basis of customary or scheduled behavior of a user.

Next, a case where authentication is executed on the basis of a time of leaving home, which is recorded each time a user leaves home, or other similar information, will be described in detail with reference to the drawings.

In the case described herein, in the entry/exit management system 100 shown in FIG. 1, each time the person 700 moves from the inside 103 to the lobby 102, the time when the person 700 leaves home is recorded using the image pickup apparatus 112, and the authentication apparatus 200 executes authentication using the time of leaving home.

For example, when the person 700 goes out from the inside 103 to the outside 101, the person 700 comes in front of the image pickup apparatus 112. Then, the image pickup apparatus 112 picks up an image of the face of the person 700. The authentication apparatus 200 executes authentication on the basis of the face image of the person 700. Furthermore, on the basis of the result of authentication, the authentication apparatus 200 records a time of leaving home in the entry/exit time database 292. After the time of leaving home has been recorded as described above, the person 700 comes in front of the doors 131 and 132. Then, a person detecting sensor (not shown) detects the presence of the person 700, and then the doors 131 and 132 open automatically. Then, as indicated by an arrow 106, the person 700 can enter the lobby 102 through the doors 131 and 132, and open the door 133 to go out from the lobby 102 to the outside 101.

FIG. 11A is a table showing time-of-leaving/coming-home information 420 recorded in the entry/exit time database 292. FIG. 11B is a table showing average-time-of-leaving/coming-home information recorded in the entry/exit time database 292. Since the average time of coming home in the time-of-leaving/coming-home information 420 and the average time of coming home in the average-time-of-leaving/coming-home information 430 are the same as the average time of coming home shown in FIGS. 6A and 6B, description thereof will be omitted.

Similarly to the case shown in FIGS. 6A and 6B, in the time-of-leaving/coming-home information 420 and the average-time-of-leaving/coming-home information 430, times are managed in association with individual user IDs.

In the time-of-leaving/coming-home information 420, upon successful authentication of the face of a person picked up by the image pickup apparatus 111, the date and time of the successful authentication are recorded as a time of coming home in association with the user ID of the person. Furthermore, upon successful authentication of the face of a person picked up by the image pickup apparatus 112, the date and time of the successful authentication are recorded as a time of leaving home in association with the user ID of the person. For example, on the date "2007/1/14", "07:02" is recorded in the field of "leaving home 1", "11:20" is recorded in the field of "coming home 1", "13:00" is recorded in the field of "leaving home 2", and "19:00" is recorded in the field of "coming home 2". As described above, when exit and entry occur a plurality of times on one day, the time of each exit and the time of each entry are recorded.

Furthermore, on the day "2007/1/17", "07:13" is recorded in the field of "leaving home 1", and "07:15" is recorded in the field of "coming home 1" as highlighted by a frame 421. Furthermore, "07:16" is recorded in the field of "leaving home 2". For example, this can be interpreted as a case where the person 700 went out for work, but forgot to carry something and immediately returned home. Furthermore, "N" highlighted in a frame 422 is recorded in the field of a time of coming home in a case where although a time of leaving home on a certain day is recorded, a corresponding time of coming home on the same day is not recorded. Furthermore, "N" in a frame 423 and in a frame 424 are recorded in a case where a time of coming home on a certain day is recorded although no corresponding time of leaving home on the same day is recorded. For example, "N" in the frame 422 on the day "2007/1/20" and "N" in the frame 423 on the day "2007/1/21" can be considered as indicating that the person 700 did not come home and stayed somewhere else on January 20. Furthermore, "N" in the frame 424 on the day "2007/1/23" can be considered as indicating that the person 700 forgot to undergo face authentication using the image pickup apparatus 112 when the person 700 left home.

For example, in a case where the person 700 forgot something to carry with and returned immediately after leaving home, it is possible that the person 700 enters immediately after leaving. Thus, a low threshold is used for authentication in a certain time range after leaving home.

As another example, a case where the person 700 undergoes authentication for entry at a time "20:32" on the day "2007/1/23" will be considered. At the time "20:32", no record of leaving home after coming home at "07:05" exists, so that records of leaving home and coming home are not consistent. In a case where records of leaving home and coming home are not consistent as described above, the possibility of a person other than the authentic user trying authentication is high. Thus, in a case where records of leaving home and coming home are not consistent, a maximum value is set as the threshold used for authentication. If the authentication at the time of coming home succeeds, "N" indicating that the time of leaving home had not been registered (the frame 424) and the time of coming home "20:32" (the frame 425) are recorded.

In the average-time-of-leaving/coming-home information 430, for each user, an average time of leaving home and an average time of coming home on each day of week are recorded. The average-time-of-leaving/coming-home information 430 is calculated on the basis of times of leaving home and times of coming home recorded in the time-of-leaving/coming-home information 420. Similarly to the case shown in FIGS. 6A and 6B, since times of leaving home and times of coming home tend to vary considerably on weekends, average times of leaving home and average times of coming home are calculated and recorded only for weekdays. Furthermore, since times of leaving home and times of coming home tend to vary among days of week on weekdays, an average time of leaving home and an average time of coming home are calculated and recorded for each day of week. Instead of average times of leaving home and average times of coming home, values calculated on the basis of frequency distributions of times of leaving home and times of coming home may be used, or values obtained through learning may be used.

Figure 12A:
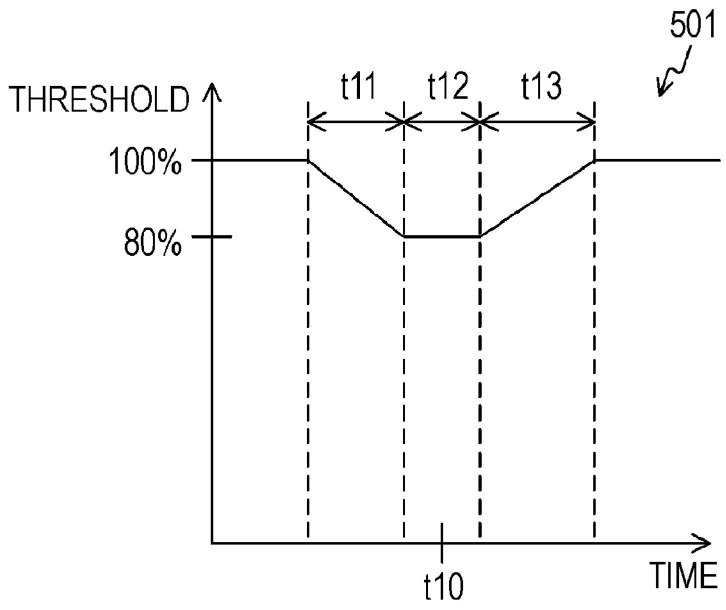
FIGS. 12A and 12B are graphs showing threshold patterns stored in the threshold-pattern storage unit.
Figure 12B:
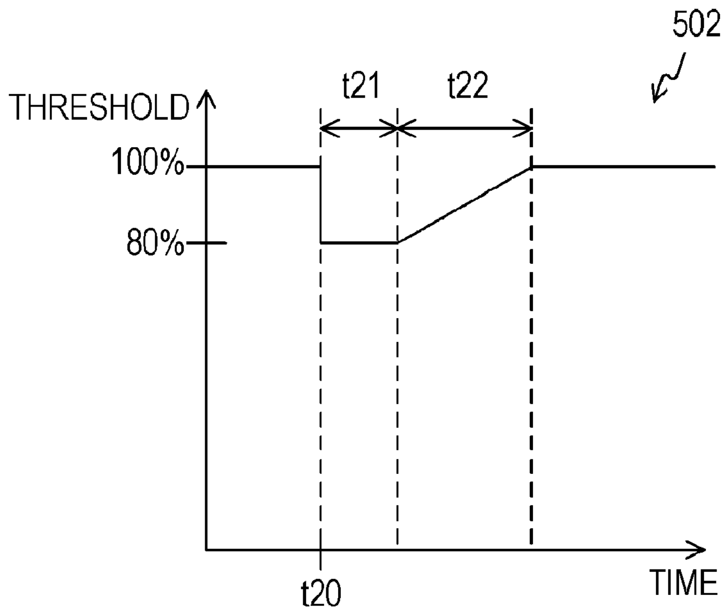

FIG. 12 is a diagram showing threshold patterns 501 and 502 stored in the threshold-pattern storage unit 294. Since the threshold pattern 501 is the same as the threshold pattern shown in FIG. 8, description of the threshold pattern 501 will be omitted. The threshold pattern 502 is used to set a threshold for authentication of a user on the basis of a time of leaving home of the user recorded in the time-of-leaving/coming-home information 420.

The threshold pattern 502 is composed of segments for time ranges t21 and t22. The time range t21 immediately succeeds a time of leaving home t20, and has a length of, for example, 6 minutes. The time range t22 immediately succeeds the time range t21, and has a length of 15 minutes. For example, the threshold is maintained at 80% in the time range t21, and the threshold is increased from 80% to 100% in accordance with time in the time range t22.

For example, a case where the person 700 undergoes authentication for entry at the time "07:15" on the day "2007/1/17" recorded in the time-of-leaving/coming-home information 420 will be considered. In this case, "07:13" in the field of "leaving home 1" is considered as the time of leaving home t20. If the current time at the time of the authentication is included in the time range t21, 80% is set as the threshold used for authentication. If the current time at the time of the authentication is included in the time range t22, a value in the range of 80% to 100% is set as the threshold used for authentication in accordance with the current time. If the current time at the time of the authentication is included in none of the time ranges t21 and t22, 100% is set as a threshold used for authentication. In the case where the person 700 undergoes authentication at the time "07:15", the current time is included in the time range t21, so that 80% is set as the threshold used for authentication.

By setting a threshold used for authentication of a user on the basis of a time of leaving home recorded in the time-of-leaving/coming-home information 420 as described above, it is possible to set a suitable threshold for the behavior of the user. Accordingly, it is possible to improve user's convenience while maintaining security.

Next, the operation of the entry/exit management system 100 according to this embodiment will be described with reference to the drawings.

Figure 13:
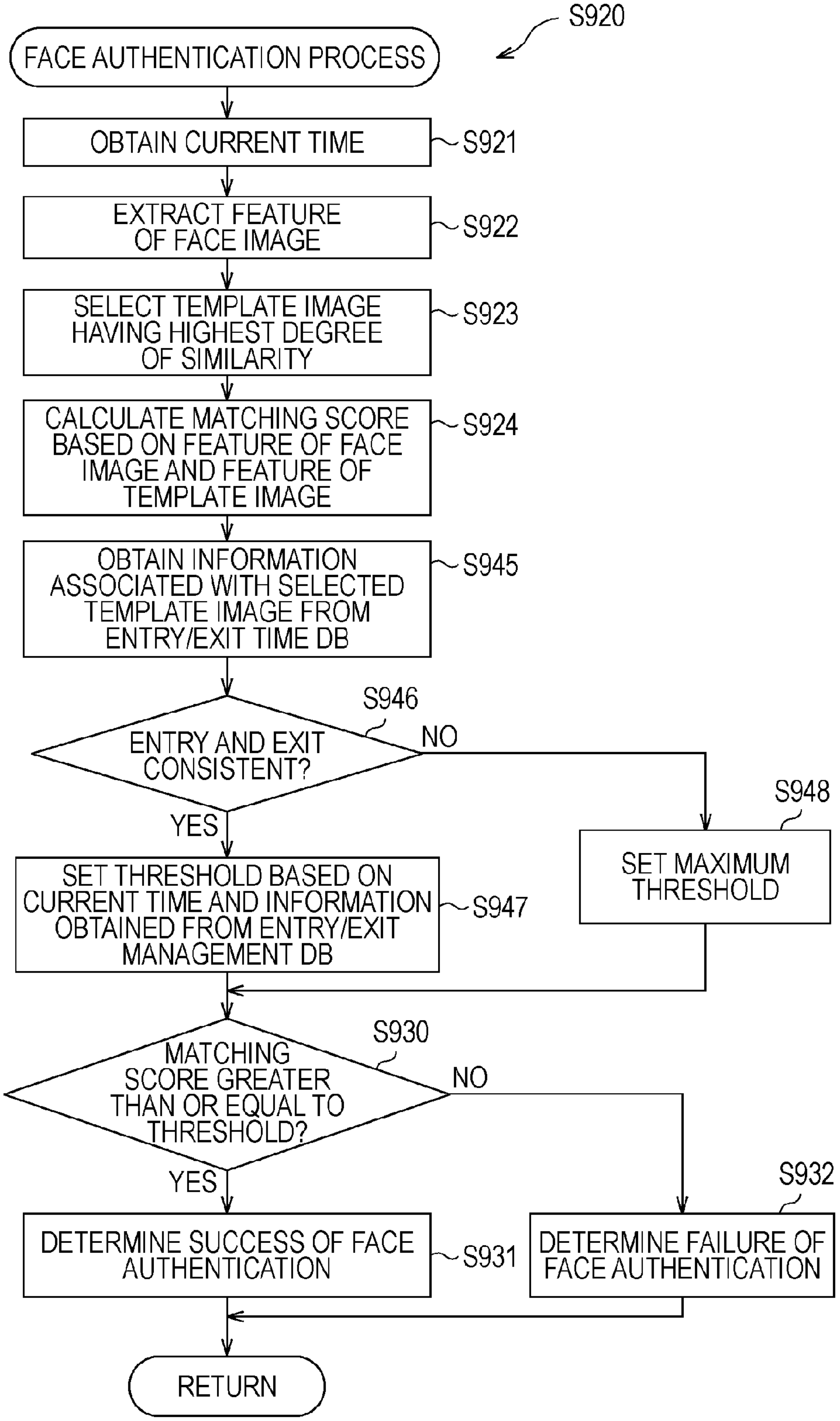
FIG. 13 is a flowchart showing a procedure of step S920 shown in FIG. 9.

FIG. 13 is a flowchart showing a procedure of the face authentication process (step S920 shown in FIG. 9) in the procedure of the entry management process executed by the entry/exit management system 100. Steps S921 to S924 and steps S930 to S932 correspond to those shown in FIG. 10, so that description thereof will be omitted.

Time-of-leaving/coming-home information and average-time-of-leaving/coming-home information stored in the entry/exit time database 292 in association with the user ID of the template image selected in step S923 are obtained (step S945). Then, on the basis of the current time obtained in step S921, it is checked whether inconsistent records of exit and entry exist in times of coming home and times of leaving home on the current day included in the obtained time-of-leaving/coming-home information (step S946). For example, in a case where authentication is executed at the time "20:32" highlighted by the frame 425 in FIG. 11, since authentication for entry is executed even though no corresponding time of leaving home has been recorded, records of exit and entry are not consistent.

If it is determined in step S946 that records of exit and entry are consistent, on the basis of the time of leaving home recorded in the time-of-leaving/coming-home information and on the basis of the current time, a threshold 1 used for authentication is calculated using the threshold pattern 502. Furthermore, on the basis of the average time of coming home for the day of week corresponding to the current day, recorded in the obtained average-time-of-leaving/coming-home information, and on the basis of the current time, a threshold 2 used for authentication is calculated using the threshold pattern 501. Then, of the thresholds 1 and 2, a lower threshold is set as the threshold used for authentication (step S947). Then, the process proceeds to step S930.

On the other hand, if it is determined in step S946 that inconsistent records of exit and entry exist, a maximum value of 100% is set as the threshold used for authentication (step S948). Then, the process proceeds to step S930.

Furthermore, on each occasion of authentication, the face image obtained for authentication may be saved, and in a case where the maximum value (100%) is set as the threshold used for authentication in step S948, the face image may be displayed on the operation panel 141 together with a message indicating the absence of a corresponding record of time of leaving home if the authentication of the user ends successfully (step S931). Thus, the user can readily determine at the entrance whether the user forgot to record a time of leaving home or an imposter has entered.

Instead of the scheduled-time-of-coming-home information 411 shown in FIG. 7, scheduled-time-of-leaving/coming-home information including a scheduled time of leaving home and a scheduled time of coming home may be stored in the user scheduler 293 so that the threshold can be changed on the basis of the scheduled time of leaving home.

Next, a case where authentication is executed on the basis of time information or the like received from an apparatus provided outside will be described in detail with reference to the drawings. The above description has dealt with a case where authentication is executed using the entry/exit management system 100 in a collective housing in which the person 700 lives. Alternatively, it is possible to set a threshold on the basis of time information or the like received from an apparatus provided outside and to execute authentication on the basis of the threshold.

Figure 14:
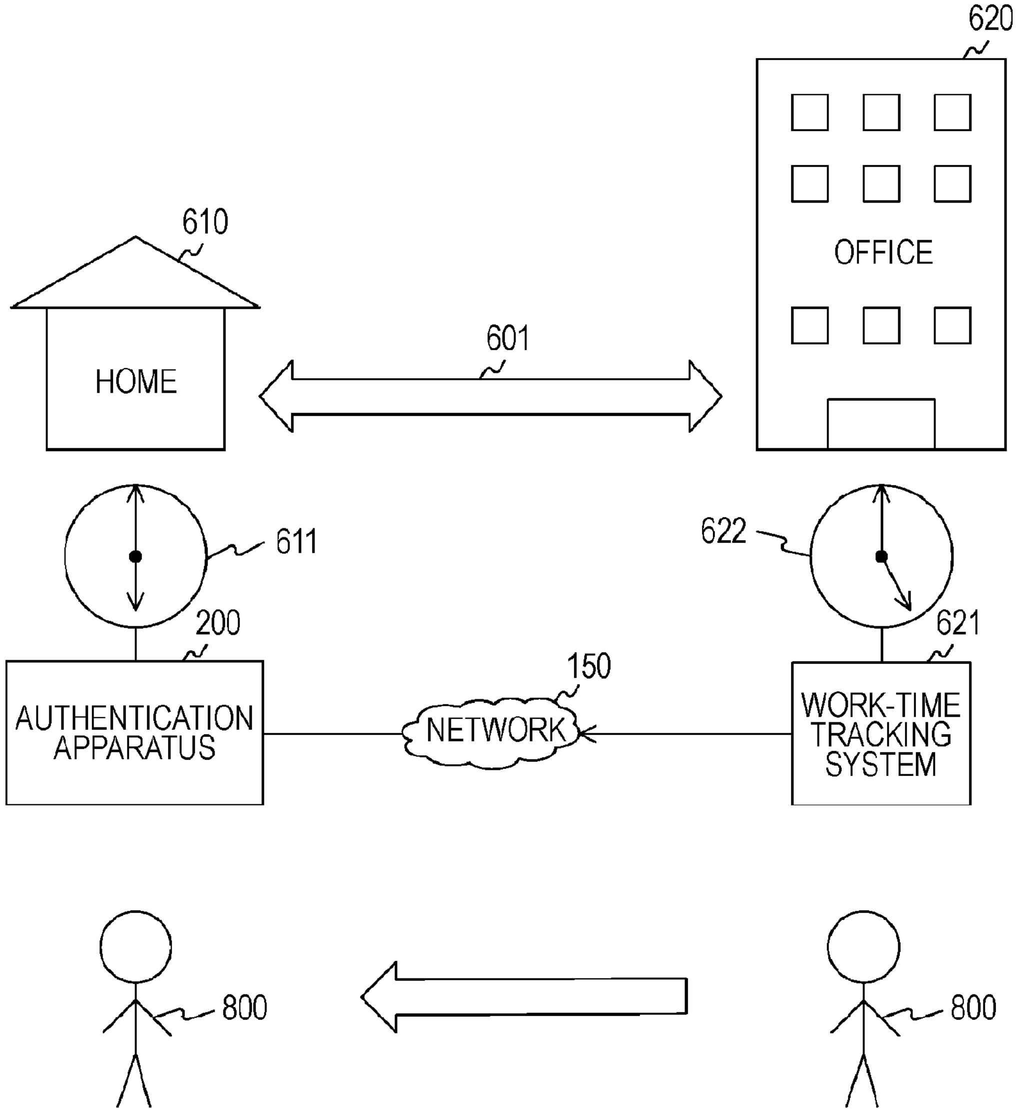
FIG. 14 is an illustration schematically showing a home and an office of a person.

FIG. 14 is a diagram schematically showing a home 610 of a person 800, where the authentication apparatus 200 is provided, and an office 620 of the person 800. At the office 620 of the person 800, a work time tracking system 621 is provided. The work time tracking system 621 records a time of arriving at the office and a time of leaving office when each employee arrives at and leaves the office, using an IC card or the like. The work time tracking system 621 is connected to the network 150 so that it can send the user ID of the person 800 and a time of leaving office to the authentication apparatus 200. The authentication apparatus 200 is configured the same as that shown in FIG. 1 and other figures.

For example, as shown in FIG. 14, the home 610 and the office 620 are distant by a commutation distance 601, and it usually takes one hour for the person 800 to travel the commutation distance 601. In this case, the possibility that the person 800 arrives at the home 610 one hour after leaving the office 620 is high. For example, in a case where the person 800 left the office 620 at "05:00" as indicated by a time of leaving office 622, the possibility that the person 800 arrives at the home 610 at "06:00" as indicated by a predicted time of coming home 611 is high. Thus, the predicted time of coming home 611 is calculated on the basis of the time of leaving office 622 transmitted from the work time tracking system 621, and the predicted time of coming home 611 is recorded in the authentication apparatus 200. When the person 800 arrives at the home 610 and undergoes authentication, it is possible to set a threshold using the predicted time of coming home 611 as a reference time.

Figure 15:
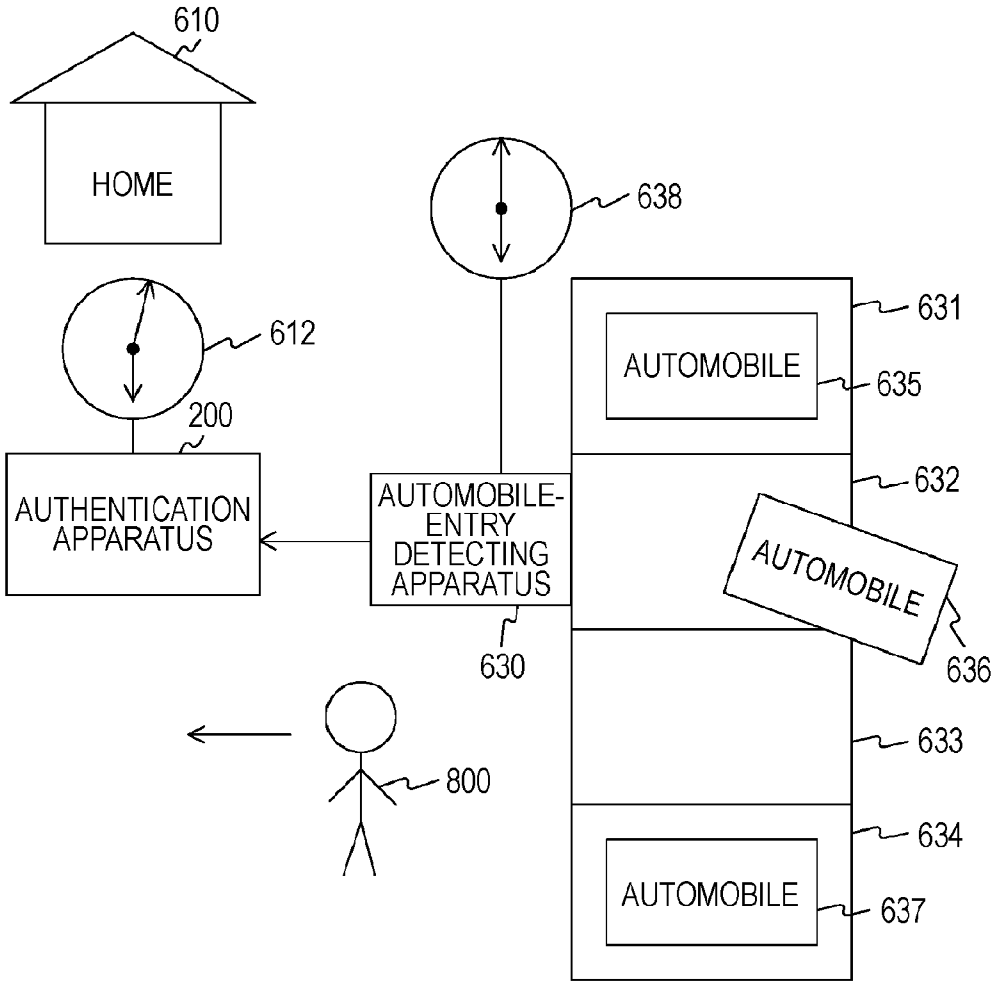
FIG. 15 is an illustration schematically showing a home of a person and parking lots that the person uses.

FIG. 15 is an illustration schematically showing the home 610 of the person 800, where the authentication apparatus 200 is provided, and parking lots 631 to 634 that the person 800 uses. Let it be assumed here that the person 800 uses the parking lot 632 among the parking lots 631 to 634, and an entry detecting apparatus 630 that detects entry of an automobile is provided at the parking lot 632. Upon detecting entry of an automobile, the entry detecting apparatus 630 sends entry detection information to the authentication apparatus 200. The authentication apparatus 200 is configured the same as that shown in FIG. 1 and other figures.

For example, let it be supposed that the parking lot 632 is at a short distance from the home 610, and it usually takes three minutes for the person 800 to walk to the parking lot 632. In this case, the possibility that the person 800 arrives at the home 610 three minutes after an automobile 636 of the person 800 enters the parking lot 632 is high. For example, in a case where the entry detecting apparatus 630 has detected entry of the automobile 636 of the person 800 at "6:00" as indicated by a time of arriving at the parking lot 638, the possibility that the person 800 arrives at the home 610 at "06:03" as indicated by a predicted time of coming home 612 is high. Thus, the predicted time of coming home 612 is calculated on the basis of the entry detection information transmitted from the entry detecting apparatus 630, and the predicted time of coming home 612 is recorded in the authentication apparatus 200. When the person 800 comes home and undergoes authentication, it is possible to set a threshold using the predicted time of coming home 612 as a reference time.

Figure 16:
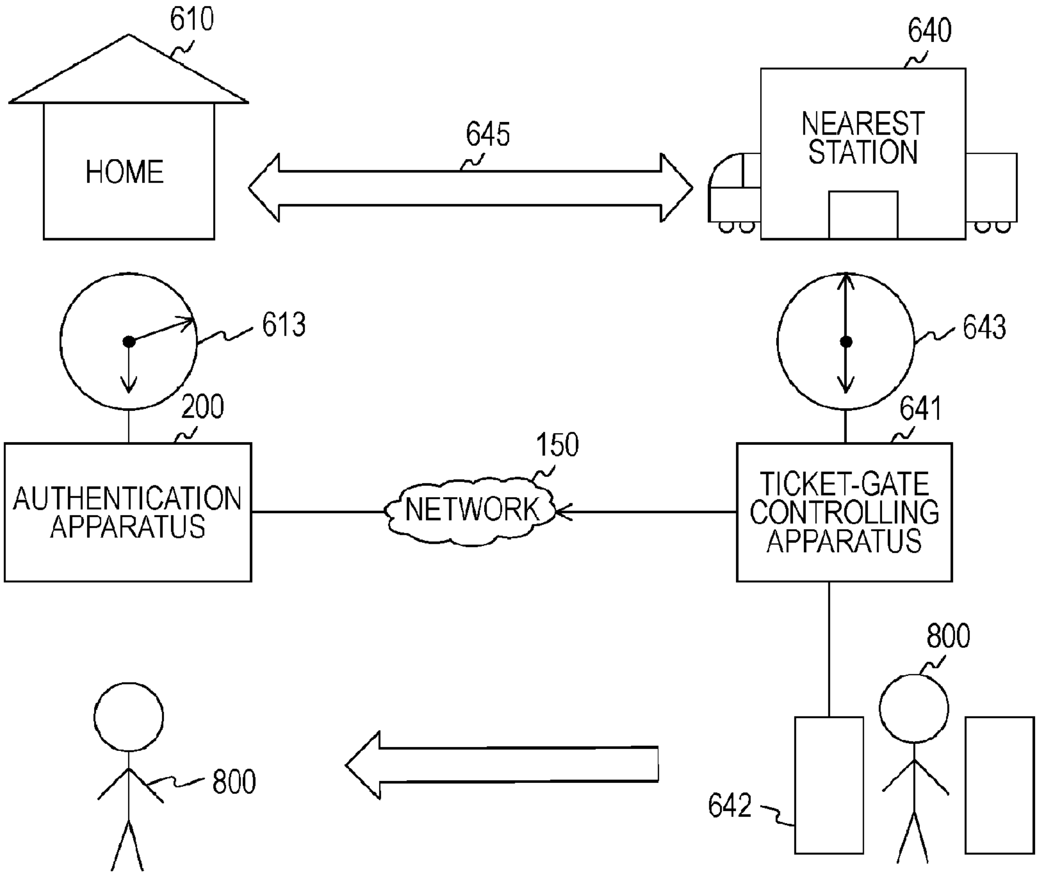
FIG. 16 is an illustration schematically showing a home of a person and a nearest station for the person.

FIG. 16 is an illustration schematically showing the home 610 of the person 800, where the authentication apparatus 200 is provided, and a nearest station 640 for the person 800. At the nearest station 640 for the person 800, a ticket gate 642 and a ticket-gate controlling apparatus 641 connected to the ticket gate 642 are provided. Furthermore, the ticket-gate controlling apparatus 641 is connected to the network 150, and it sends the user ID of the person 800 and a time of passing through the ticket gate to the authentication apparatus 200. The authentication apparatus 200 is configured the same as that shown in FIG. 1 and other figures.

For example, let it be supposed that the home 610 and the nearest station 640 are distant by a distance 645, and it usually takes 10 minutes for the person 800 to walk to the nearest station 640. In this case, the possibility that the person 800 arrives at the home 610 10 minutes after passing through the ticket gate 642 at the nearest station 640 is high. For example, in a case where the person 800 passes through the ticket gate 642 at "06:00", as indicated by a ticket-gate passing time 643, the possibility that the person 800 arrives at the home 610 at "06:10", as indicated by a predicted time of coming home 613, is high. Thus, the predicted time of coming home 613 is calculated on the basis of the ticket-gate passing time 643 transmitted from the ticket-gate controlling apparatus 641, and the predicted time of coming home 613 is recorded in the authentication apparatus 200. When the person 800 arrives at the home 610 and undergoes authentication, it is possible to set a threshold using the predicted time of coming home 613 as a reference time. The predicted times of coming home 611 to 613 may be recorded, for example, in the user scheduler 293.

Figures 17A, 17B:
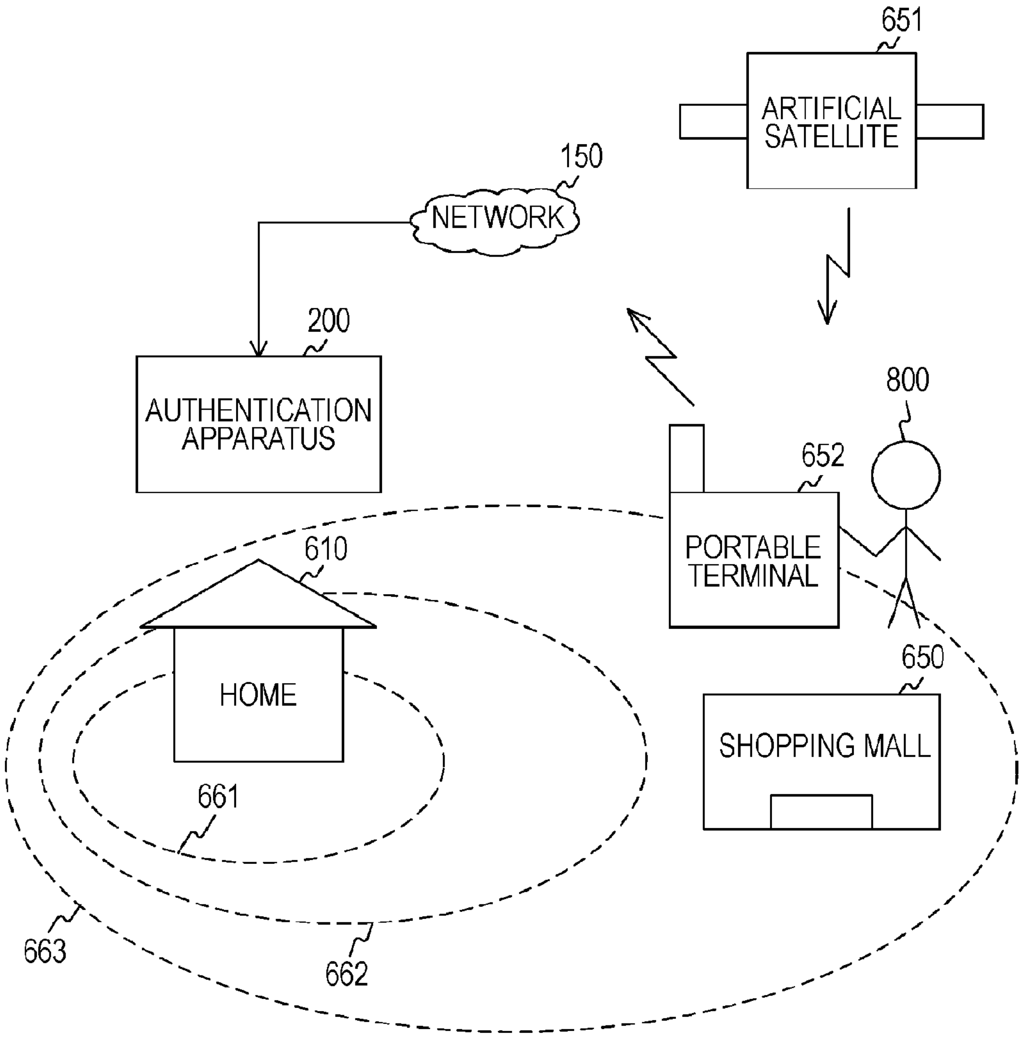
FIG. 17 is an illustration schematically showing a home of a person, a portable terminal that can be connected to an authentication apparatus via a network, and an artificial satellite.

FIG. 17A is an illustration schematically showing the home 610 of the person 800, where the authentication apparatus 200 is provided, a portable terminal 652 that can connect to the authentication apparatus 200 via the network 150, and an artificial satellite 651. FIG. 17B is a table showing relationship among distance from the authentication apparatus 200, threshold, and arrival time. The portable terminal 652 can obtain information representing the current position on the basis of GPS information obtained from the artificial satellite 651, and sends the information representing the current position to the authentication apparatus 200. The authentication apparatus 200 includes a current-position storage unit that stores the information representing the current position received from the portable terminal 652. The authentication apparatus 200 is configured otherwise the same as that shown in FIG. 1 and other figures.

For example, as shown in FIG. 17A, with the home 610 of the person 800 at the center, a range having a radius of 1 km is indicated by a broken line 661, a range having a radius of 3 km is indicated by a broken line 662, and a range having a radius of 5 km is indicated by a broken line 663. For example, a shopping mall 650 exists in a range with a radius of 3 to 5 km.

For example, when the person 800 is at the shopping mall 650 existing in the range with a radius of 3 to 5 km, information representing "3 to 5 km" as the current position of the person 800 is sent from the portable terminal 652 of the person 800 and stored in the current-position-information storage unit of the authentication apparatus 200. At the time of authentication, it is possible to set a threshold on the basis of the current position information stored in the current-position-information storage unit. Furthermore, it is possible to calculate a predicted time of coming home on the basis of an arrival time based on the current position information stored in the current-position-information storage unit and to set a threshold using the predicted time of coming home as a reference time. The predicted time of coming home may be recorded, for example, in the user scheduler 293. As described above, when the person 800 is in the vicinity of the home 610, since the possibility that the person 800 arrives at the home 610 soon is high, it is possible to set a suitable threshold using a current position or arrival time.

Figure 18:
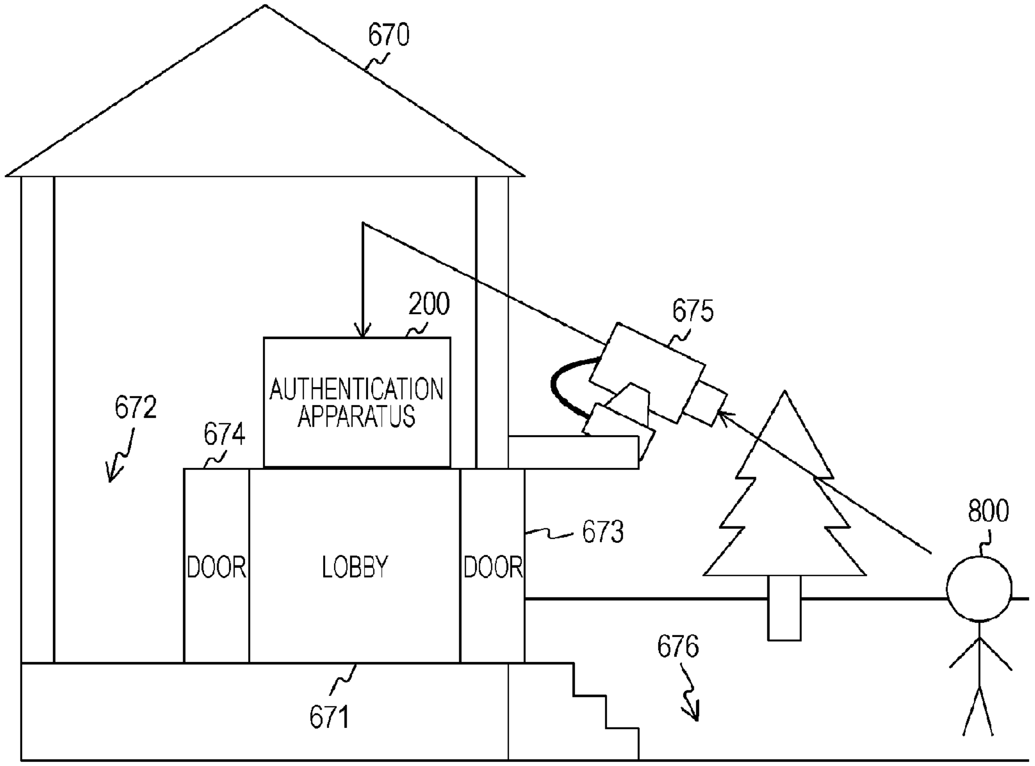
FIG. 18 is a schematic illustration showing a home of a person, where an authentication apparatus and a monitoring camera are provided.

FIG. 18 is an illustration schematically showing a home 670 of the person 800, where the authentication apparatus 200 and a monitoring camera 675 are provided. The monitoring camera 675 is provided outside 676. In the home 670, a lobby 671, an inside 672, and doors 673 and 674 exist. The lobby 671, the inside 672, and the doors 673 and 674 correspond respectively to the lobby 102, the inside 103, the doors 133, and the doors 131 and 132.

The monitoring camera 675 is capable of picking up an image of the figure of a person present at the outside 676, and estimating the identity of the person on the basis of the image. The monitoring camera 676 sends information regarding the estimated person to the authentication apparatus 200. The authentication apparatus 200 is configured the same as that shown in FIG. 1 and other figures.

For example, as shown in FIG. 18, let it be supposed that the monitoring camera 675 has picked up an image of the figure of the person 800 and has estimated the identity as being the person 800. In this case, the monitoring camera 675 sends to the authentication apparatus 200 information indicating that the person present at the outside 676 has been estimated as being the person 800. When the monitoring camera 675 has estimated the person as being the person 800, the possibility that the person 800 opens the door 673 to enter the lobby 671 and undergoes authentication in a short time is high. Thus, when information indicating that the person present at the outside 676 has been estimated as being the person 800 has been received from the monitoring camera 675, it is possible to reduce the threshold for the person 800 and to use the reduced threshold for authentication.

As described above, face authentication is used in the embodiment described above. Alternatively, authentication may be executed using other types of biometric information, such as fingerprint, vein, or iris information.

Furthermore, although authentication is executed using only one type of biometric information in the embodiment described above, authentication may be executed on the basis of a plurality of types of biometric information.

Furthermore, it is possible to use non-biometric authentication, such as PIN authentication or IC card authentication, in combination with biometric authentication.

Furthermore, it is possible to store a plurality of types of biometric information, such as face, fingerprint, vein, and iris information, so that when it is determined that authentication regarding one type of biometric information has failed, success or failure of authentication can be determined using other types of biometric information in turn. In this case, the authentication method can be changed so that authentication becomes stricter progressively. For example, the order of authentication methods may be face, fingerprint, vein, and iris.

Furthermore, for example, in cases where records of exit and entry are not consistent or where a record of a time of coming home considerably differs from a time expected on the basis of customary behavior, authentication may be executed again on the basis of a maximum threshold using authentication data temporarily saved immediately before, and a person in charge of security may be notified in case of an error. The behavior that considerably differs from customary behavior refers to, for example, a large number of attempts for authentication in a short period, or an attempt for authentication at a time on which authentication is not usually executed.

Furthermore, a time range in which security should be enforced may be set so that, for example, a maximum threshold is used in the time range.

It should be understood by those skilled in the art that various modifications, combinations, sub-combinations and alterations may occur depending on design requirements and other factors insofar as they are within the scope of the appended claims or the equivalents thereof.

What is claimed is:

1. An authentication apparatus comprising:

time-information storage means for storing a reference time used for authentication;

biometric-information storage means for storing biometric information used for authentication;

biometric-information obtaining means for obtaining biometric information of a person;

matching-score calculating means for calculating a matching score representing a degree of similarity between the biometric information stored in the biometric-information storage means and the obtained biometric information;

current-time obtaining means for obtaining a current time;

threshold setting means for setting a threshold used for authentication, on the basis of the obtained current time and the reference time stored in the time-information storage means; and authentication-result determining means for determining success or failure of authentication regarding the obtained biometric information, on the basis of the calculated matching score and the set threshold, wherein the biometric-information obtaining means includes first biometric-information obtaining means for obtaining biometric information of the person at a time of entry of the person and second biometric-information obtaining means for obtaining biometric information of the person at a time of exit of the person, the time-information storage means stores an entry time representing the time when the first biometric-information obtaining means obtained the biometric information and an exit time representing the time when the second biometric-information obtaining means obtained the biometric information, in such a manner that the entry time and the exit time are associated with the person relevant to the biometric information, the matching score calculating means calculates a matching score representing a degree of similarity between the biometric information stored in the biometric-information storage means and the biometric information obtained by the first biometric-information obtaining means, and the threshold setting means sets the threshold on the basis of the obtained current time and on the basis of consistency between the entry time and the exit time stored in the time-information storage means in association with the person relevant to the biometric information obtained by the first biometric-information obtaining means.

2. The authentication apparatus according to claim 1, wherein the reference time stored in the time-information storage means includes at least one of a preset scheduled entry time and a statistical entry time calculated on the basis of past statistical data, and wherein if the scheduled entry time and the statistical entry time are both stored in the time-information storage means, the threshold setting means sets the threshold using the scheduled entry time.

3. The authentication apparatus according to claim 1, further comprising receiving means for receiving time information or position information for calculating the reference time from an external apparatus, wherein the reference time stored in the time-information storage means is a time calculated on the basis of the time information or position information received from the external apparatus.

4. The authentication apparatus according to claim 1, further comprising:

feature extracting means for extracting a feature relating to the obtained biometric information;

wherein the biometric-information storage means stores a feature relating to the biometric information together with the biometric information, and wherein the matching-score calculating means calculates the matching score on the basis of the feature relating to the biometric information stored in the biometric-information storage means and the extracted feature relating to the obtained biometric information.

5. The authentication apparatus according to claim 4, wherein the time-information storage means stores a plurality of reference times for a plurality of persons in such a manner that the plurality of reference times are associated individually with the plurality of persons, wherein the biometric-information storage means stores a plurality of pieces of biometric information for the plurality of persons in such a manner that the plurality of pieces of biometric information are associated individually with the plurality of persons, wherein the matching-score calculating means selects a piece of biometric information having a highest degree of similarity with the obtained biometric information among the plurality of pieces of biometric information stored in the biometric-information storage means on the basis of features relating to the plurality of pieces of biometric information and the extracted feature relating to the obtained biometric information, and calculates the matching score on the basis of the feature relating to the selected piece of biometric information and the extracted feature relating to the obtained biometric information, and wherein the threshold setting means sets the threshold on the basis of the obtained current time and on the basis of a reference time associated with a person relevant to the selected piece of biometric information among the plurality of reference times stored in the time-information storage means.

6. The authentication apparatus according to claim 1, wherein the threshold setting means sets the threshold further on the basis of the exit time stored in the time-information storage means in association with the person relevant to the biometric information obtained by the first biometric-information obtaining means.

7. The authentication apparatus according to claim 1, wherein the biometric-information storage means stores a plurality of types of biometric information used for authentication, wherein the biometric-information obtaining means obtains a plurality of types of biometric information corresponding to the plurality of types of biometric information stored in the biometric-information storage means, and wherein, if it is determined that authentication regarding one type of biometric information among the plurality of types of obtained biometric information has failed, the authentication-result determining means determines success or failure of authentication regarding another type of biometric information among the plurality of types of obtained biometric information, the another type being different from the one type used for the failed authentication, on the basis of the calculated matching score and the set threshold.

8. The authentication apparatus according to claim 1, further comprising:

person-estimation-information obtaining means for obtaining person-estimation information from a person estimating apparatus that estimates identity of a person, wherein when the person-estimation-information obtaining means has obtained the person-estimation information from the person estimating apparatus, the threshold setting means sets the threshold to be a relatively low value for the person corresponding to the person-estimation information.

9. An entry management apparatus comprising:

time-information storage means for storing a reference time used for authentication;

biometric-information storage means for storing biometric information used for authentication;

biometric-information obtaining means for obtaining biometric information of a person;

matching-score calculating means for calculating a matching score representing a degree of similarity between the biometric information stored in the biometric-information storage means and the obtained biometric information;

current-time obtaining means for obtaining a current time;

threshold setting means for setting a threshold used for authentication, on the basis of the obtained current time and the reference time stored in the time-information storage means;

authentication-result determining means for determining success or failure of authentication regarding the obtained biometric information, on the basis of the calculated matching score and the set threshold; and entry permitting means for permitting entry of the person relevant to the obtained biometric information if the authentication regarding the obtained biometric information is determined as successful, wherein the biometric-information obtaining means includes first biometric-information obtaining means for obtaining biometric information of the person at a time of entry of the person and second biometric-information obtaining means for obtaining biometric information of the person at a time of exit of the person, the time-information storage means stores an entry time representing the time when the first biometric-information obtaining means obtained the biometric information and an exit time representing the time when the second biometric-information obtaining means obtained the biometric information, in such a manner that the entry time and the exit time are associated with the person relevant to the biometric information, the matching score calculating means calculates a matching score representing a degree of similarity between the biometric information stored in the biometric-information storage means and the biometric information obtained by the first biometric-information obtaining means, and the threshold setting means sets the threshold on the basis of the obtained current time and on the basis of consistency between the entry time and the exit time stored in the time-information storage means in association with the person relevant to the biometric information obtained by the first biometric-information obtaining means.

10. An entry-and-exit management apparatus comprising:

first biometric-information obtaining means for obtaining biometric information of a person at a time of entry of the person;

second biometric-information obtaining means for obtaining biometric information of the person at a time of exit of the person;

time-information storage means for storing an entry time representing the time when the first biometric-information obtaining means obtained the biometric information and an exit time representing the time when the second biometric-information obtaining means obtained the biometric information, in such a manner that the entry time and the exit time are associated with the person relevant to the biometric information;

biometric-information storage means for storing biometric information used for authentication;

matching score calculating means for calculating a matching score representing a degree of similarity between the biometric information stored in the biometric-information storage means and the biometric information obtained by the first biometric-information obtaining means;

current-time obtaining means for obtaining a current time;

threshold setting means for setting a threshold used for authentication on the basis of the obtained current time and on the basis of consistency between the entry time and the exit time stored in the time-information storage means in association with the person relevant to the biometric information obtained by the first biometric-information obtaining means;

authentication-result determining means for determining success or failure of authentication regarding the biometric information obtained by the first biometric-information obtaining means, on the basis of the calculated matching score and the set threshold; and entry permitting means for permitting entry of the person relevant to the biometric information obtained by the first biometric-information obtaining means if the authentication regarding the obtained biometric information is determined as successful.

11. An entry management system including a biometric-information obtaining apparatus that obtains biometric information of a person at a time of entry of the person and a door opening and closing apparatus that opens and closes a door provided at an entrance, the entry management system comprising:

time-information storage means for storing a reference time used for authentication;

biometric-information storage means for storing biometric information used for authentication;

matching-score calculating means for calculating a matching score representing a degree of similarity between the biometric information stored in the biometric-information storage means and the obtained biometric information;

current-time obtaining means for obtaining a current time;

threshold setting means for setting a threshold used for authentication, on the basis of the obtained current time and the reference time stored in the time-information storage means;

authentication-result determining means for determining success or failure of authentication regarding the obtained biometric information, on the basis of the calculated matching score and the set threshold; and door opening and closing control means for controlling the door opening and closing apparatus so that the door is opened if the authentication regarding the obtained biometric information is determined as successful, wherein the biometric-information obtaining apparatus obtains biometric information of the person at a time of entry of the person and biometric information of the person at a time of exit of the person, the time-information storage means stores an entry time representing the time when the biometric-information obtaining apparatus obtained the biometric information of the person at the time of entry of the person and an exit time representing the time when the biometric-information obtaining apparatus obtained the biometric information of the person at the time of exit of the person, in such a manner that the entry time and the exit time are associated with the person relevant to the biometric information, the matching score calculating means calculates a matching score representing a degree of similarity between the biometric information stored in the biometric-information storage means and the biometric information of the person at the time of entry of the person, and the threshold setting means sets the threshold on the basis of the obtained current time and on the basis of consistency between the entry time and the exit time stored in the time-information storage means in association with the person relevant to the biometric information of the person at the time of entry of the person.

12. An entry-and-exit management system including a first biometric-information obtaining apparatus that obtains biometric information of a person at a time of entry of the person, a second biometric-information obtaining apparatus that obtains biometric information of the person at a time of exit of the person, and a door opening and closing apparatus that opens and closes a door provided at an entrance, the entry-and-exit management system comprising:

time-information storage means for storing an entry time representing the time when the first biometric-information obtaining apparatus obtained the biometric information and an exit time representing the time when the second biometric-information obtaining apparatus obtained the biometric information, in such a manner that the entry time and the exit time are associated with the person relevant to the biometric information;

biometric-information storage means for storing biometric information used for authentication;

matching score calculating means for calculating a matching score representing a degree of similarity between the biometric information stored in the biometric-information storage means and the biometric information obtained by the first biometric-information obtaining apparatus;

current-time obtaining means for obtaining a current time;

threshold setting means for setting a threshold used for authentication on the basis of the obtained current time and on the basis of consistency between the entry time and the exit time stored in the time-information storage means in association with the person relevant to the biometric information obtained by the first biometric-information obtaining apparatus;

authentication-result determining means for determining success or failure of authentication regarding the biometric information obtained by the first biometric-information obtaining apparatus, on the basis of the calculated matching score and the set threshold; and door opening and closing control means for controlling the door opening and closing apparatus so that the door is opened if the authentication regarding the biometric information obtained by the first biometric-information obtaining apparatus is determined as successful.

13. An authentication processing method for an authentication apparatus including time-information storage means for storing a reference time used for authentication and biometric-information storage means for storing biometric information used for authentication, the authentication processing method comprising the steps of:

obtaining biometric information of a person;

obtaining a current time;

calculating a matching score representing a degree of similarity between the biometric information stored in the biometric-information storage means and the obtained biometric information;

setting a threshold used for authentication, on the basis of the obtained current time and the reference time stored in the time-information storage means; and determining success or failure of authentication regarding the obtained biometric information, on the basis of the calculated matching score and the set threshold, wherein obtaining biometric information of a person includes obtaining biometric information of the person at a time of entry of the person and obtaining biometric information of the person at a time of exit of the person, the time-information storage means stores an entry time representing the time of entry of the person and an exit time representing the time of exit of the person, in such a manner that the entry time and the exit time are associated with the person relevant to the biometric information, calculating a matching score includes calculating a matching score representing a degree of similarity between the biometric information stored in the biometric-information storage means and the biometric information of the person at the time of entry of the person, and setting a threshold used for authentication includes setting the threshold on the basis of the obtained current time and on the basis of consistency between the entry time and the exit time stored in the time-information storage means in association with the person relevant to the biometric information.

14. A non-transitory recording medium having recorded therein a program for an authentication apparatus including time-information storage means for storing a reference time used for authentication and biometric-information storage means for storing biometric information used for authentication, the program causing a computer to execute the steps of:

obtaining biometric information of a person;

obtaining a current time;

calculating a matching score representing a degree of similarity between the biometric information stored in the biometric-information storage means and the obtained biometric information;

setting a threshold used for authentication, on the basis of the obtained current time and the reference time stored in the time-information storage means; and determining success or failure of authentication regarding the obtained biometric information, on the basis of the calculated matching score and the set threshold, wherein obtaining biometric information of a person includes obtaining biometric information of the person at a time of entry of the person and obtaining biometric information of the person at a time of exit of the person, the time-information storage means stores an entry time representing the time of entry of the person and an exit time representing the time of exit of the person, in such a manner that the entry time and the exit time are associated with the person relevant to the biometric information, calculating a matching score includes calculating a matching score representing a degree of similarity between the biometric information stored in the biometric-information storage means and the biometric information of the person at the time of entry of the person, and setting a threshold used for authentication includes setting the threshold on the basis of the obtained current time and on the basis of consistency between the entry time and the exit time stored in the time-information storage means in association with the person relevant to the biometric information.

15. An authentication apparatus comprising:

a time-information storage unit configured to store a reference time used for authentication;

a biometric-information storage unit configured to store biometric information used for authentication;

a biometric-information obtaining unit configured to obtain biometric information of a person;

a matching-score calculating unit configured to calculate a matching score representing a degree of similarity between the biometric information stored in the biometric-information storage unit and the obtained biometric information;

a current-time obtaining unit configured to obtain a current time;

a threshold setting unit configured to set a threshold used for authentication, on the basis of the obtained current time and the reference time stored in the time-information storage unit; and an authentication-result determining unit configured to determine success or failure of authentication regarding the obtained biometric information, on the basis of the calculated matching score and the set threshold, wherein the biometric-information obtaining unit is configured to obtain biometric information of the person at a time of entry of the person and biometric information of the person at a time of exit of the person, the time-information storage unit is configured to store an entry time representing the time when the biometric-information obtaining unit obtained the biometric information of the person at the time of entry of the person and an exit time representing the time when the biometric-information obtaining unit obtained the biometric information of the person at the time of exit of the person, in such a manner that the entry time and the exit time are associated with the person relevant to the biometric information, the matching score calculating unit is configured to calculate a matching score representing a degree of similarity between the biometric information stored in the biometric-information storage unit and the biometric information of the person at the time of entry of the person, and the threshold setting unit is configured to set the threshold on the basis of the obtained current time and on the basis of consistency between the entry time and the exit time stored in the time-information storage unit in association with the person relevant to the biometric information of the person at the time of entry of the person.

16. An entry management apparatus comprising:

a time-information storage unit configured to store a reference time used for authentication;

a biometric-information storage unit configured to store biometric information used for authentication;

a biometric-information obtaining unit configured to obtain biometric information of a person;

a matching-score calculating unit configured to calculate a matching score representing a degree of similarity between the biometric information stored in the biometric-information storage unit and the obtained biometric information;

a current-time obtaining unit configured to obtain a current time;

a threshold setting unit configured to set a threshold used for authentication, on the basis of the obtained current time and the reference time stored in the time-information storage unit;

an authentication-result determining unit configured to determine success or failure of authentication regarding the obtained biometric information, on the basis of the calculated matching score and the set threshold; and an entry permitting unit configured to permit entry of the person relevant to the obtained biometric information if the authentication regarding the obtained biometric information is determined as successful, wherein the biometric-information obtaining unit is configured to obtain biometric information of the person at a time of entry of the person and biometric information of the person at a time of exit of the person, the time-information storage unit is configured to store an entry time representing the time when the biometric-information obtaining unit obtained the biometric information of the person at the time of entry of the person and an exit time representing the time when the biometric-information obtaining unit obtained the biometric information of the person at the time of exit of the person, in such a manner that the entry time and the exit time are associated with the person relevant to the biometric information, the matching score calculating unit is configured to calculate a matching score representing a degree of similarity between the biometric information stored in the biometric-information storage unit and the biometric information of the person at the time of entry of the person, and the threshold setting unit is configured to set the threshold on the basis of the obtained current time and on the basis of consistency between the entry time and the exit time stored in the time-information storage unit in association with the person relevant to the biometric information of the person at the time of entry of the person.

17. An entry-and-exit management apparatus comprising:

a first biometric-information obtaining unit configured to obtain biometric information of a person at a time of entry of the person;

a second biometric-information obtaining unit configured to obtain biometric information of the person at a time of exit of the person;

a time-information storage unit configured to store an entry time representing the time when the first biometric-information obtaining unit obtained the biometric information and an exit time representing the time when the second biometric-information obtaining unit obtained the biometric information, in such a manner that the entry time and the exit time are associated with the person relevant to the biometric information;

a biometric-information storage unit configured to store biometric information used for authentication;

a matching score calculating unit configured to calculate a matching score representing a degree of similarity between the biometric information stored in the biometric-information storage unit and the biometric information obtained by the first biometric-information obtaining unit;

a current-time obtaining unit configured to obtain a current time;

a threshold setting unit configured to set a threshold used for authentication on the basis of the obtained current time and on the basis of consistency between the entry time and the exit time stored in the time-information storage unit in association with the person relevant to the biometric information obtained by the first biometric-information obtaining unit;

an authentication-result determining unit configured to determine success or failure of authentication regarding the biometric information obtained by the first biometric-information obtaining unit, on the basis of the calculated matching score and the set threshold; and an entry permitting unit configured to permit entry of the person relevant to the biometric information obtained by the first biometric-information obtaining unit if the authentication regarding the obtained biometric information is determined as successful.

18. An entry management system including a biometric-information obtaining apparatus that obtains biometric information of a person at a time of entry of the person and a door opening and closing apparatus that opens and closes a door provided at an entrance, the entry management system comprising:

a time-information storage unit configured to store a reference time used for authentication;

a biometric-information storage unit configured to store biometric information used for authentication;

a matching-score calculating unit configured to calculate a matching score representing a degree of similarity between the biometric information stored in the biometric-information storage unit and the obtained biometric information;

a current-time obtaining unit configured to obtain a current time;

a threshold setting unit configured to set a threshold used for authentication, on the basis of the obtained current time and the reference time stored in the time-information storage unit;

an authentication-result determining unit configured to determine success or failure of authentication regarding the obtained biometric information, on the basis of the calculated matching score and the set threshold; and a door opening and closing control unit configured to control the door opening and closing apparatus so that the door is opened if the authentication regarding the obtained biometric information is determined as successful, wherein the biometric-information obtaining apparatus obtains biometric information of the person at a time of entry of the person and biometric information of the person at a time of exit of the person, the time-information storage unit is configured to store an entry time representing the time when the biometric-information obtaining apparatus obtained the biometric information of the person at the time of entry of the person and an exit time representing the time when the biometric-information obtaining apparatus obtained the biometric information of the person at the time of exit of the person, in such a manner that the entry time and the exit time are associated with the person relevant to the biometric information, the matching score calculating unit is configured to calculate a matching score representing a degree of similarity between the biometric information stored in the biometric-information storage unit and the biometric information of the person at the time of entry of the person, and the threshold setting unit is configured to set the threshold on the basis of the obtained current time and on the basis of consistency between the entry time and the exit time stored in the time-information storage unit in association with the person relevant to the biometric information of the person at the time of entry of the person.

19. An entry-and-exit management system including a first biometric-information obtaining apparatus that obtains biometric information of a person at a time of entry of the person, a second biometric-information obtaining apparatus that obtains biometric information of the person at a time of exit of the person, and a door opening and closing apparatus that opens and closes a door provided at an entrance, the entry-and-exit management system comprising:

a time-information storage unit configured to store an entry time representing the time when the first biometric-information obtaining apparatus obtained the biometric information and an exit time representing the time when the second biometric-information obtaining apparatus obtained the biometric information, in such a manner that the entry time and the exit time are associated with the person relevant to the biometric information;

a biometric-information storage unit configured to store biometric information used for authentication;

a matching score calculating unit configured to calculate a matching score representing a degree of similarity between the biometric information stored in the biometric-information storage unit and the biometric information obtained by the first biometric-information obtaining apparatus;

a current-time obtaining unit configured to obtain a current time;

a threshold setting unit configured to set a threshold used for authentication on the basis of the obtained current time and on the basis of consistency between the entry time and the exit time stored in the time-information storage unit in association with the person relevant to the biometric information obtained by the first biometric-information obtaining apparatus;

an authentication-result determining unit configured to determine success or failure of authentication regarding the biometric information obtained by the first biometric-information obtaining apparatus, on the basis of the calculated matching score and the set threshold; and a door opening and closing control unit configured to control the door opening and closing apparatus so that the door is opened if the authentication regarding the biometric information obtained by the first biometric-information obtaining apparatus is determined as successful.

* * * * *